United States Patent
Mishra et al.

(10) Patent No.: US 10,489,063 B2
(45) Date of Patent: Nov. 26, 2019

(54) MEMORY-TO-MEMORY INSTRUCTIONS TO ACCELERATE SPARSE-MATRIX BY DENSE-VECTOR AND SPARSE-VECTOR BY DENSE-VECTOR MULTIPLICATION

(71) Applicant: Intel Corporation, Santa Clara, CA (US)

(72) Inventors: Asit K. Mishra, Hillsboro, OR (US); Deborah T. Marr, Portland, OR (US); Edward T. Grochowski, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 15/384,178

(22) Filed: Dec. 19, 2016

(65) Prior Publication Data

US 2018/0173437 A1 Jun. 21, 2018

(51) Int. Cl.
*G06F 3/06* (2006.01)
*G06F 9/30* (2018.01)
*G06F 9/38* (2018.01)

(52) U.S. Cl.
CPC .......... *G06F 3/0614* (2013.01); *G06F 3/0646* (2013.01); *G06F 3/0683* (2013.01); *G06F 9/3001* (2013.01); *G06F 9/30036* (2013.01); *G06F 9/3877* (2013.01); *G06F 2212/1016* (2013.01)

(58) Field of Classification Search
None
See application file for complete search history.

(56) References Cited

U.S. PATENT DOCUMENTS

| | | | | |
|---|---|---|---|---|
| 5,825,677 | A * | 10/1998 | Agarwal | G06F 15/8023 708/520 |
| 5,963,746 | A * | 10/1999 | Barker | G06F 15/8007 709/238 |
| 2007/0198621 | A1 * | 8/2007 | Lumsdaine | G06F 17/16 708/200 |
| 2012/0278376 | A1 | 11/2012 | Bakos | |

(Continued)

FOREIGN PATENT DOCUMENTS

EP   1923793 A2   5/2008

OTHER PUBLICATIONS

European Search Report for European Application No. EP 17 20 2192, 3 pages, May 14, 2018.

(Continued)

*Primary Examiner* — Michael D. Yaary
(74) *Attorney, Agent, or Firm* — Lowenstein Sandler LLP

(57) ABSTRACT

First elements of a dense vector to be multiplied with first elements of a first row of a sparse array may be determined. The determined first elements of the dense vector may be written into a memory. A dot product for the first elements of the sparse array and the first elements of the dense vector may be calculated in a plurality of increments by multiplying a subset of the first elements of the sparse array and a corresponding subset of the first elements of the dense vector. A sequence number may be updated after each increment is completed to identify a column number and/or a row number of the sparse array for which the dot product calculations have been completed.

20 Claims, 13 Drawing Sheets

(56) References Cited

U.S. PATENT DOCUMENTS

| | | | |
|---|---|---|---|
| 2013/0073599 A1* | 3/2013 | Maloney | G06F 9/3001 |
| | | | 708/514 |
| 2014/0108481 A1* | 4/2014 | Davis | G06F 17/16 |
| | | | 708/607 |
| 2014/0173192 A1* | 6/2014 | Omtzigt | G06F 15/8023 |
| | | | 711/106 |
| 2015/0067009 A1 | 3/2015 | Strauss et al. | |
| 2016/0283240 A1* | 9/2016 | Mishra | G06F 9/30036 |

OTHER PUBLICATIONS

Ciobanu, Catalin B., et al., "Scalability Evaluation of a Polymorphic Register File: A CG Case Study," ECCV 2016 Conference, Springer International Publishing, Cham, pp. 13-25, Feb. 24, 2011.
Morad, Amir, et al. "Efficient Dense and Sparse Matrix Multiplication on GP-SIMD," 24th International Workshop on Power and Timing Modeling, Optimization and Simulation (PATMOS), IEEE, pp. 1-8, Sep. 29, 2014.

\* cited by examiner

US 10,489,063 B2

MEMORY-TO-MEMORY INSTRUCTIONS TO ACCELERATE SPARSE-MATRIX BY DENSE-VECTOR AND SPARSE-VECTOR BY DENSE-VECTOR MULTIPLICATION

TECHNICAL FIELD

This disclosure relates to the field of processing devices and, in particular, to processing devices having accelerated matrix and vector multiplications with improved instructions and highly banked memory.

BACKGROUND

Central processing units (CPUs) are not generally configured to efficiently perform matrix multiplication between sparse arrays (e.g., sparse vectors and sparse matrices) and dense vectors. CPUs with advanced vector extension (AVX) units generally perform sparse matrix times dense vector and sparse vector times dense vector multiplication operations by gathering from and scattering to a dense vector data structure. However, existing architectures include two read ports and one write port in the level 1 (L1) cache. Accordingly, the gather throughput for the L1 cache is two 4 Byte reads per clock cycle if data is spread across more than two cache lines. The L2 cache has one read port, and that read port may be shared by multiple cores. Accordingly, the gather throughput in many processors is 0.5-1 4 Byte word per clock cycle. Similarly, with just one write port in the L1 and L2 caches, the scatter throughput is the same or lower. Accordingly, existing CPUs have a hardware bottleneck for performing gathers and scatters.

BRIEF DESCRIPTION OF THE DRAWINGS

The present disclosure is illustrated by way of example, and not by way of limitation, in the figures of the accompanying drawings.

DETAILED DESCRIPTION

Figure 1:
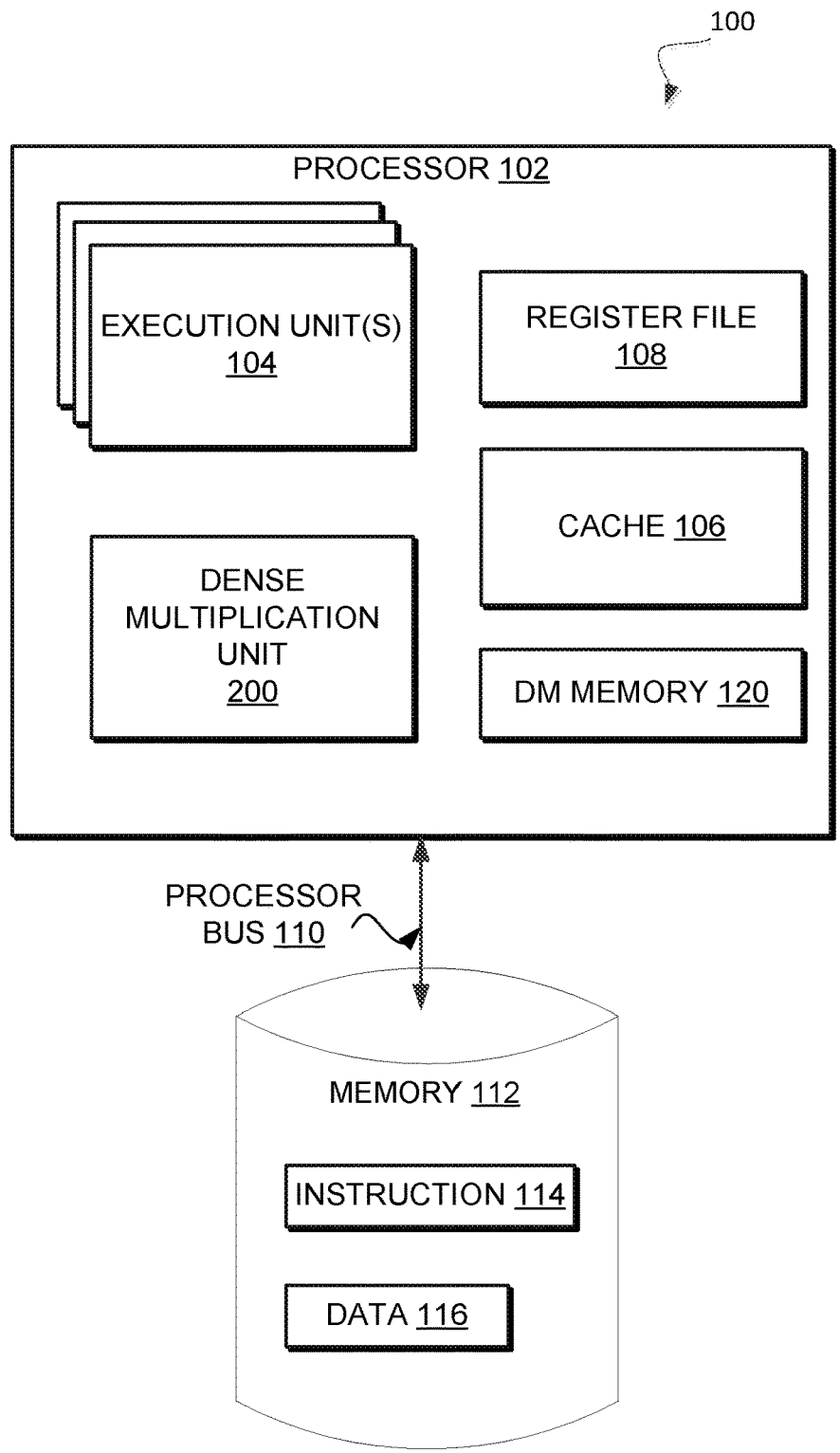
FIG. 1 is a block diagram illustrating an example architecture of a processor coupled to a memory, in accordance with some implementations of the disclosure.

The following description sets forth numerous specific details such as examples of specific systems, components, circuits, methods, and so forth, in order to provide a good understanding of several embodiments of the present disclosure. It will be apparent to one skilled in the art, however, that at least some embodiments of the present disclosure may be practiced without these specific details. In other instances, well-known circuits or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Described herein is a processing device, system, and method for accelerating sparse array and dense vector multiplications with improved instructions and highly banked memory in a processor. In one embodiment, a new, memory-to-memory instruction may be used by a processing device (e.g., a central processing unit (CPU)) to optimize or improve multiplication calculations between a sparse array (e.g., a sparse matrix or a sparse vector) and a dense vector. In another embodiment, a processing device may include a highly-ported, narrow-bandwidth memory to increase the throughput of a dot product calculation during the multiplication. The memory may be coupled to a dense multiplication hardware circuit. Calculating a multiplication between a sparse vector and a dense vector or a sparse matrix and a dense vector may involve thousands of gathers, scatters, multiplications and accumulations. Cache memory is a high cost, fast memory which resides on or near the processing device to reduce the time required to read data from main memory. The cache memory may be split into multiple regions, or levels, based upon proximity to the processing device or other factors (e.g., latency or cost). For example a level one cache may exist on or nearest to a core of the processing device and for processing devices with more than one core, there may exist a level one cache for each of the cores. A level two cache may exist on the processing device further from the cores than the level one cache or near the processing device further than the level one cache. A level two cache may also be shared between multiple cores. A last level cache may also exist on the processing device further from the cores than the level one and two caches or near the processing device further than the level one and two caches. In other embodiments, the last level cache may also be the level one, level two, or even level N cache. In one embodiment, the last level cache may be shared between all of the cores.

Reading and writing data from memory to cache may be throttled (e.g., bottlenecked) by the number of read and write ports available to the cache at each level. When performing thousands of gather and scatter operations during a sparse array and dense vector multiplication, reading and writing from one or two ports limits processing to a few bytes per cycle. In one embodiment, the cache (e.g., L1 and/or L2 cache) may be modified to incorporate a highly-banked memory structure. In some instances, architectural dependencies may cause the access latency of a highly-banked cache to increase, adversely affecting single threaded workload performance. To avoid such increases in latency, an additional cache or memory may instead be implemented within the processing device architecture. The additional cache or memory may be a highly-banked structure to increase the ports available to improve the gather and scatter performance of the sparse array and dense vector multiplication without introducing latency or other inefficiencies.

Page faults or interrupts may initiate a context switch of the processing device from the processing of a first instruction to a second instruction. Additional cache and memory architecture may increase the latency of context switches as the architecture state of each additional cache or memory element must be preserved and restored. Accordingly, the additional highly-banked, narrow-bandwidth cache or memory architecture may be implemented alongside an existing cache which may remain optimized for single- and multi-threaded performance. Thus, reliability and efficiency of the cache is preserved and efficiency of processing sparse array and dense vector multiplications is increased. The additional highly-banked, narrow-bandwidth cache or memory architecture may be accessible only to multiplication instructions for performing the sparse array and dense vector multiplication, and thus may not be exposed architecturally to the CPU, foregoing requirements of the architecture state being preserved and restored during a context switch of the processing device. The highly-ported, narrow-bandwidth memory is discussed in more detail in conjunction with FIG. 4 below.

The combination of a new memory-to-memory sparse array*dense vector multiplication instruction and the additional highly-banked, narrow bandwidth cache or memory on the processing device may improve the reliability of the processing device without having a significant impact on its other performance while substantially increasing operating efficiency for sparse array and dense vector multiplications. For example, the additional memory in the processing device may increase the throughput of a sparse array*dense vector multiplication operation to include processing of an entire cache line of operands at once (e.g., sixteen four-byte operands in one cycle or eight eight-byte operands in one cycle).

In one embodiment, the additional memory may be instantiated for only the processing of a sparse matrix by dense vector multiplication instruction or sparse vector by dense vector multiplication instruction. A processor context switch from performing one operation to performing another operation may be implemented without saving the architectural state of the additional memory. For example, flash invalidating the memory may remove the necessity of preserving the architectural state of the memory because it can be repopulated after the context switch. The result is an increase in throughput of the multiplications over time as the operands are processed in larger groupings rather than one or two at a time and the architecture state associated with the memory may be discarded.

In an example, a first set of elements in a sparse array (e.g., sparse matrix or sparse vector containing many zero entries) may be read into cache. The elements of the sparse array may be evaluated, determining which elements of a dense vector may need to be read into the memory. In one embodiment, only the necessary elements are read into memory. In another embodiment, a block of elements, including elements in-between the necessary elements, are read into memory. A dot product may be computed for each row of the sparse array. In one embodiment, the dot product may be computed in one cycle using a multiply-accumulate (MAC) unit. In another embodiment, the dot product may be computed incrementally according to a sequence numbering scheme. For example, each element of the dot product may be calculated according to the sequence numbering scheme incrementally and the dot product calculated at each row once the incremental calculations are complete. The sequence numbering scheme is discussed in more detail in conjunction with FIG. 5 below.

The highly-banked, narrow-bandwidth memory may process an entire cache line of operands in each cycle. Thus, the costly overhead and bottlenecking associated with a scatter and gather of thousands of elements in memory accesses are avoided and processing speed and efficiency of a sparse array by dense vector multiplication is greatly increased.

FIG. 1 is a block diagram illustrating a computing system 100 that implements a dense multiplication unit 200 and dense multiplication (DM) memory 120 for accelerating sparse array and dense vector multiplications. The computing system 100 is formed with a processor 102 coupled to a main memory 112, and may additionally include other components such as a graphical processing unit (GPU), a motherboard, a network adapter, a secondary storage (e.g., a disk drive or solid state drive), and so on. Computing system 100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

Processor 102 may be any of various complex instruction set computing (CISC) processors, various reduced instruction set computing (RISC) processors, various very long instruction word (VLIW) processors, various hybrids thereof, or other types of processors. In one or more embodiments, the processor 100 may be a general-purpose processor, such as, for example, one of the general-purpose processors manufactured by Intel Corporation, of Santa Clara, Calif. A few representative examples of suitable general-purpose processors available from Intel Corporation include, but are not limited to, Intel® Atom™ Processors, Intel® Core™ processors, Intel® Core™2 processors, Intel® Pentium® processors, and Intel® Celeron® processors.

Alternatively, the processor may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors. In still other embodiments, the processor or instruction processing apparatus may represent a controller (e.g., a microcontroller), or other type of logic circuit capable of processing microcode or microinstructions.

In one embodiment, processor 102 executes dense multiplication (DM) unit 200 to determine which cache lines of cache memory 106 to read into the DM memory 120 to implement a new memory-to-memory dense vector by sparse array multiplication instruction. When the dense vector by sparse array multiplication instruction is executed, the dense multiplication unit 200 accesses memory 112 and/or cache 106 for elements of the sparse array and then determines which corresponding elements of the dense vector to read into the DM memory 120 for processing the multiplication. Dense multiplication unit 200 then calculates the dot product for each row in the sparse array according to a sequence numbering scheme and outputs the resulting vector to memory 112. The new sparse array by dense vector multiplication instruction is memory-to-memory because it reads the sparse array and dense vectors from memory 116 and writes the resulting vector to memory 116. Dense multiplication unit 200 is a hardware circuit (e.g., a dense multiplication hardware circuit) that performs multiplication between a dense vector and a sparse array responsive to execution of the spare array by dense vector multiplication instruction by an execution unit 104. Additional details with regard to dense multiplication unit 200 are described in more detail below with respect to FIGS. 2-5.

In one embodiment, processor 102 includes one or more execution units 104 to execute a sparse array and dense vector multiplication instruction in accordance with one or more embodiments as described herein. Execution units 104 may implement a process that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102 is coupled to a processor bus 110 that transmits data signals between the processor 102 and other components or circuits in the system 100, such as main memory 112 storing instruction 114, data 116 or any combination thereof. The other components of the system 100 may include, but are not limited to, a graphics accelerator, a memory controller hub, an I/O controller hub, a wireless transceiver, a Flash BIOS, a network controller, an audio controller, a serial expansion port, and an I/O controller.

Processor 102 may employ execution units including logic to perform algorithms for processing data, such as in the embodiments described herein. Processor 102 is representative of processing systems based on the PENTIUM III™, PENTIUM 4™ Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, computing system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Processor 102 may further include cache memory 106 (e.g., an L1 cache, L2 cache and/or L3 cache), register file 108, DM memory 120, and dense multiplication unit 200. Cache 106 may be a specialized memory unit used by processor 102 to reduce the average memory access times. Cache 106 may be a smaller, faster memory which stores copies of data from the most frequently used locations in main memory 112. Data may be transferred between memory 112 and cache 106 in blocks of fixed size, called cache lines. When a cache line is copied from memory 112 into cache 106, a cache entry is created. The cache entry may include the copied data as well as the requested memory location. When processor 102 is to read from or write to a location in memory 112, processor 102 may first check whether a copy of the relevant data is currently in cache 106. If the data is found in cache 106, processor 102 may read from or write to the cache 106. These cache accesses may typically be much faster than reading from or writing to memory 112. In one embodiment, as long as most memory accesses are cached memory locations, the average latency of memory accesses will be closer to the cache latency than to the latency of main memory. In one embodiment, the processor 102 includes a Level 1 (L1) internal cache memory 106. Depending on the architecture, the processor 102 may have a single internal cache memory or multiple levels of internal cache memories (e.g., L1 and L2). For example, the processor 102 may include an instruction cache (e.g., an L1 instruction cache) and a data cache (e.g. an L1 data cache) as part of its L1 internal cache memory. Other embodiments include a combination of both internal and external caches depending on the particular implementation and needs. Register file 108 is to store different types of data in various registers including, but not limited to, integer registers, floating point registers, vector registers, banked registers, shadow registers, checkpoint registers, status registers, configuration registers, and instruction pointer registers. In one embodiment, register file 108 may store a current sequence number (described in greater detail below) of the sequence number scheme during a context switch based on a fault or interrupt.

Cache 106, however, may be limited in throughput, size and/or capacity. Thus, in order to efficiently process the thousands of operation of a sparse array by dense vector multiplication, a highly-banked, highly-ported, narrow-bandwidth memory DM memory 120 may be added to the processing device in close proximity to the cache 106 and dense multiplication unit 200. DM memory 120 may include, but is not limited to, a dynamic random access memory (DRAM) device, a static random access memory (SRAM) device, flash memory device, or other memory device. In one embodiment, dense multiplication unit 200 (or the execution unit executing the sparse array by dense vector multiplication instruction) may determine which elements or bank of elements to read from memory 112 or cache 106 into DM memory 120. While cache 106 may be limited to one or two read and writes per cycle, DM memory 120 may perform an entire cache line (e.g., eight or sixteen) of reads and writes per clock cycle.

Execution unit 104, including logic to perform integer and floating point operations, also resides in the processor 102. It should be noted that the execution unit may or may not have a floating point unit. The processor 102, in one embodiment, includes a microcode (μcode) ROM to store microcode, which when executed, is to perform processes for certain macroinstructions or handle complex scenarios. Here, microcode is potentially updateable to handle logic bugs/fixes for processor 102. Alternative embodiments of an execution unit 104 may also be used in micro controllers, embedded processors, graphics devices, DSPs, and other types of logic circuits.

System 100 further includes a main memory 112. Main memory 112 may include, but is not limited to, a dynamic random access memory (DRAM) device, a static random access memory (SRAM) device, flash memory device, or other memory device. Main memory 112 stores instructions, data, and/or page files represented by data signals that are to be executed by the processor 102. The processor 102 is coupled to the main memory 112 via a processor bus 110. A system logic chip, such as a memory controller hub (MCH) may be coupled to the processor bus 110 and main memory 112. An MCH can provide a high bandwidth memory path to memory 112 for instruction and data storage and for storage of graphics commands, data and textures. The MCH can be used to direct data signals between the processor 102, main memory 112, and other components, or circuits, in the system 100 and to bridge the data signals between processor bus 110, main memory 112, cache memory 106, and system I/O, for example. The MCH may be coupled to main memory 112 through a memory interface.

In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the main memory 112, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For one embodiment of system 100, the dense multiplication unit 200 may be used with a system on a chip. The memory for one such system may be a flash memory. The flash memory may be located on the same die as the processor and other system components. Additionally, other logic blocks, such as a memory controller or graphics controller, may also be located on a system on a chip.

Figure 2:
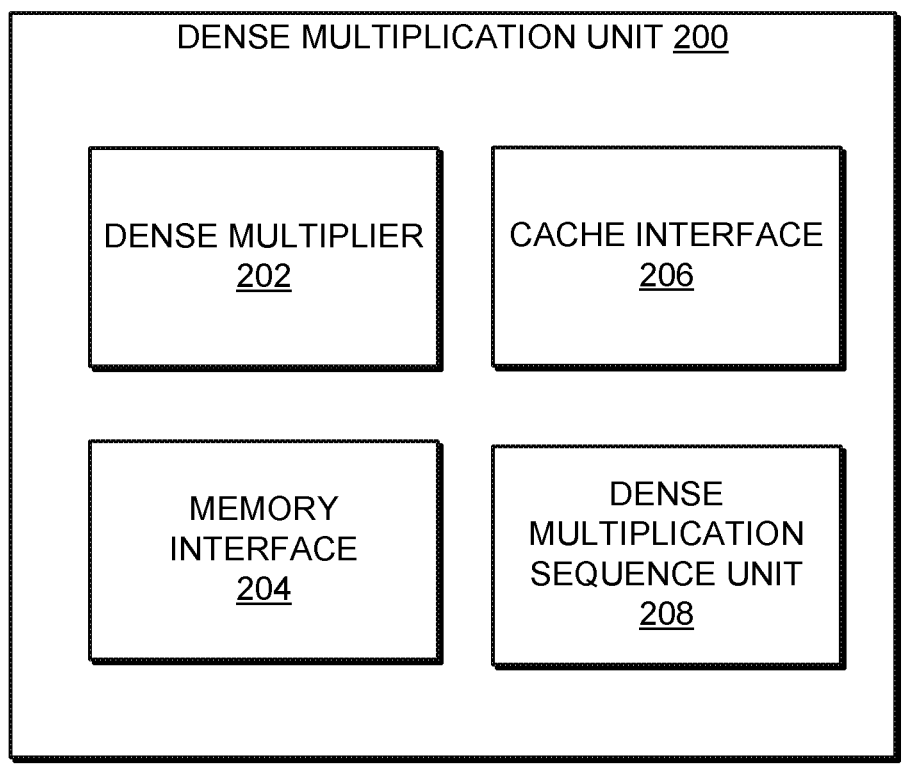
FIG. 2 is a block diagram illustrating an example dense multiplication unit of a processor, in accordance with some implementations of the disclosure.

FIG. 2 is an example dense multiplication unit 200 in accordance with some implementations of the disclosure. In general, the dense multiplication unit 200 may correspond to the dense multiplication unit 200 of a processor 102 as shown in FIG. 1. In one embodiment, the dense multiplication unit 200 includes a dense multiplier (also referred to as a dense multiplication hardware circuit) 202, a memory interface 204, a cache interface 206, and a dense multiplication sequence unit 208. In alternative implementations, the functionality of one or more of the components, or circuits, may be combined or divided.

As shown in FIG. 2, the dense multiplication unit 200 may include a dense multiplier 202 that may perform the dot product calculations of the dense vector by sparse array multiplication and may manage the cache entries of cache 106 as well as the dense vector entries of DM memory 120. Cache management includes the receipt of new cache entries to store in the cache 106, tracking of the cache entries in the cache 106 for cache entry characteristics, and curating the cache entries. DM memory processing includes the receipt of new entries (also referred to as elements) to store in the DM memory 120, tracking of the entries in the DM memory 106 for validity and reuse, and curating the DM memory entries. For example, entries may be stored in the cache 106 or DM memory 120 when an instruction requests new data from memory to be read. Data may be read as a series of bytes (e.g., 4/8 byte values) or as a contiguous chunk of memory (e.g., 32 bytes, 64 bytes, 100 bytes). For example, DM memory 120 is a highly-banked, highly-ported, narrow bandwidth memory structure, which may receive 64 bytes of memory at a time corresponding to sixteen four-byte elements of the dense vector and/or sparse array. Cache entries may have a timestamp establishing when they were first stored into cache, a timestamp indicating when the entry was last used or how many times the entries have been used, and an indication of whether the values are clean (e.g., have not been changed while stored in cache) or dirty (e.g., have been modified while in cache). Cache entries may be curated according to cache replacement algorithms or policies (e.g., First In First Out (FIFO), Last In First Out (LIFO), Least Recently Used (LRU), Most Recently Used (MRU), Random Replacement (RR), Least-Frequently Used (LFU), or other algorithms). DM memory entries may have a valid bit for identifying if the entries of the corresponding dense vector elements are valid for reuse or if they should be read from memory and written into DM memory 120 again.

The memory interface 204 may communicate with memory 112 over processor bus 110. The memory interface 204 may receive or send data which is managed by dense multiplier 202 or the dense multiplication sequence unit 208. For example, memory interface 204 may receive a new cache entry to be stored in the cache 106 or send an evicted cache entry to memory 112 to be stored. Memory interface 204 may further identify addresses in memory based off a physical address or an index with a pointer to memory. For example, processor 102 may receive an instruction requesting to multiply a sparse array with a dense vector. For example, an instruction requesting to multiply a sparse array with a dense vector may include fields identifying a start memory address of the sparse array, a memory address of the dense vector, and a memory address for an output vector that results from the multiplication operation. The instruction may further include fields identifying a number of rows in the sparse matrix and a number of elements (i.e., length) of the dense vector. In an embodiment, the dense vector may terminate with a sentinel (index=−1) and may not include a field for identifying the length of the dense vector. The instruction may also be a memory-to-memory instruction where the instruction reads the sparse array and dense vector from memory and writes the output vector to memory. A subsequent action may read the entries associated with the sparse array or dense vector into the cache. A further subsequent action may read the entries associated with the dense vector into the DM memory 120. The dense multiplier 202 may identify the cache entry using an index to a corresponding cache line. The memory interface 204 may determine the physical memory address corresponding to the cache or DM memory entry. Data calculated by the dense multiplier may be written back to memory 112 by writing the calculated value to the corresponding physical memory address. For example, elements of the sparse array may be identified by a memory start address of the instruction, and the index from that start address iteratively stepped over during the calculation of the multiplication. Corresponding entries of the dense vector, identified by the column number of the sparse array entries, may be read into the DM memory 120 using the memory interface 204.

The cache interface 206 may communicate with cache 106. The cache interface 206 may receive or send data which is managed by dense multiplier 202. For example, the dense multiplier 202 may receive a new cache entry to be stored in the cache or may remove an evicted cache entry from the cache using the cache interface 206.

The dense multiplication sequence unit 208 may monitor the cache interface 206, memory interface 204, and/or the dense multiplier 202 for receipt of entries of the sparse array. For example, the dense multiplication sequence unit 208 may intercept the read associated with the sparse array when elements of the sparse array are read into any of the dense multiplier 202, memory interface 204, and cache interface 206. The dense multiplication sequence unit 208 may then identify which elements of the dense vector correspond to the identified elements of the sparse array and write them into DM memory 120. Identifying corresponding elements and reading them into DM memory 120 are discussed in more detail in conjunction with FIGS. 4 and 5 below. The dense multiplication sequence unit may then direct the dense multiplier 202 to perform the dot product calculations according to an incremental series of steps associated with the sequence number. Upon each successful completion of the incremental series of steps, a sequence number tracking the progress may be updated to indicate that processing of the dot product has progressed beyond the last sequence number. For example, the dense multiplication sequence unit 208 may detect that all or part of a row of the sparse array has been received over the cache interface 206 or memory interface 204. The sparse array elements may then be evaluated to determine which corresponding dense vector elements are necessary for computing the dot product for the next received row of the sparse array. For example, a column index of the sparse element may correspond to an index of the dense vector for each element to be included in calculating the dot product of a row of the sparse array. The dense multiplication sequence 208 unit may then check the DM memory 120 over the memory interface 204 for elements of the dense vector which are presently stored in the DM memory and also marked as valid. For example, elements which are both present and valid may be reused while elements that are not present or are present but not valid may be read from the cache 106 over the cache interface 206 or read from memory 112 over the memory interface 204. The DM memory 120 may have stored elements 1-5 of a dense vector and the next elements of the sparse array may correspond to elements 1, 4, and 6 of the dense vector. Elements 1 and 4 may be reused, while the memory 112 or cache 106 may be read to identify element 6 or a block of elements including element 6. The dense multiplication sequence unit 208 may identify a sequence of multiplications and accumulates according the a sequence number for iteratively calculating the dot product of each row of the sparse array and may direct the dense multiplier 202 to retrieve the corresponding elements of the dense vector and sparse array for iteratively performing the calculations.

As each iterative calculation is completed, the dense multiplication sequence unit may update a value of a sequence number stored in a register of the register file 108 to track the current progress. The iterative calculations for calculating the dot product of a row of a sparse matrix are discussed in more detail in conjunction with FIG. 5 below. The dense multiplication sequence unit 208 may further write the results of the iterative calculation as it is completed to memory 112 using the memory interface 204 or may further write the results of the dot product calculation for each row of the sparse array to memory 112 using the memory interface 204.

The dense multiplication sequence unit 208 may detect an interrupt or page fault at the processor 102, causing the processor to perform a context switch from one instruction execution to another or to recover from the fault. For example, the dense multiplication sequence unit 208 may flash clear the DM memory 120 using the memory interface 204 to ensure there is no state keeping outside of the instruction boundary, preventing an architecture state from being preserved during the context switch and restored afterwards. This may improve the efficiency of the processor by reducing the workload of the context switch when an interrupt is being processed. The most recently completed iterative calculation may be written to memory 112 using the memory interface 204 and the sequence number of the current instruction saved at a register in register file 108.

Upon successful handling of the interrupt or fault, the sequence number may be retrieved from the register file 108 and the dense multiplication unit 208 may determine which sparse array element (e.g., which row and column number of a sparse array) is associated with the sequence number, read the sparse array element and subsequent sparse array elements, determine the corresponding dense vector elements, and resume computing the dot product where the iterative calculations were last stored. Dense multiplication unit 208 may additionally read the partially computed dot product values in some instances.

Figure 3A:
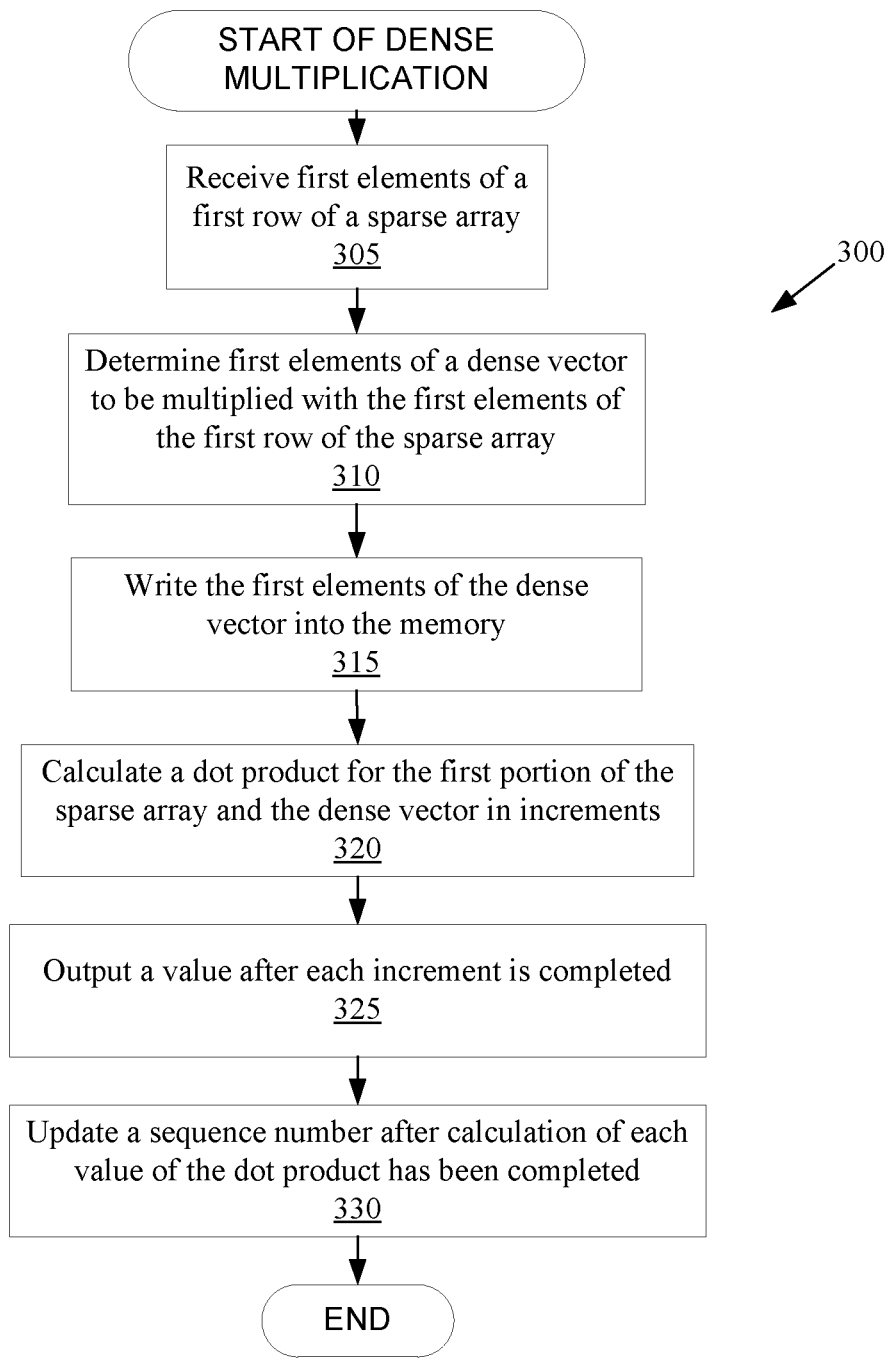
FIG. 3A is a flow diagram illustrating a method of executing a sparse array times a dense vector multiplication operation, according to an embodiment.

FIG. 3A is a flow diagram illustrating a method 300 of executing a sparse array times a dense vector multiplication operation. Method 300 may calculate the matrix multiplication of a sparse array with a dense vector using a highly-banked, highly-ported, low bandwidth memory and a sequence number for iteratively performing the calculation. The method 300 may be performed by processing logic that may include hardware (e.g., processing device, circuitry, dedicated logic, programmable logic, microcode, etc.), software (e.g., instructions run on a processing device), or a combination thereof. In some implementations, the method 300 may be performed by the dense multiplication unit 200 of FIG. 1 or 2 and/or an execution unit of a processor executing a sparse array*dense vector multiplication instruction.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

As shown in FIG. 3A, the method 300 may begin with the processing logic receiving first elements of a first row of a sparse array (block 305). For example, the dense multiplication sequence unit 208 may detect that elements of the sparse array have been received at the dense multiplier 202 and use the received elements in the subsequent method steps. The processing logic may further determine first elements of a dense vector to be multiplied with the first elements of the first row of the sparse array (block 310). For example, the sparse elements detected may include values for columns 1, 3, and 5. The dense vector elements determined may include the first, third, and fifth dense vector elements. The processing logic may further write the first elements of the dense vector into memory (block 315). For example, the first eight elements of the dense vector may be read into the DM memory 120. In one embodiment, processing logic reads the cache lines that include the determined dense vector elements, and writes those cache lines into the DM memory. The cache lines include the determined dense vector elements and may additionally include additional dense vector elements that might not be used for multiplication with the first sparse array elements.

The processing logic may further calculate the dot product for the first portion of the sparse array and the dense vector (block 320). For example, the first, third, and fifth elements of the sparse array may be multiplied with the first, third, and fifth elements of the dense vector and the three products accumulated to generate the output for the first row of the sparse array. The processing logic may further output a value after each increment is completed (block 325). For example, the first product of the multiply and accumulate may be output during calculation of the dot product. The processing logic may further update a sequence number after calculation of each value of the dot product has been completed (block 330). If the entire sparse array has been multiplied by the dense vector, then the method 300 would end. If there are remaining elements (e.g., rows and/or columns) of the sparse array that have not yet been multiplied by the dense vector, then the method 300 may be repeated for a next set of elements. This may be repeated until all of the sparse array has been multiplied by the dense vector.

In an example, after completing the first row of calculations, a sequence number may be stored indicating that the first three multiplications have been completed and the dot product calculated. In an embodiment, the sparse array may only include one row and processing may end after the first row has been received. In another embodiment, the sparse array may include only one row but that row may be longer than the width of the dense multiplier. For example, the row of the sparse array may include one hundred elements and the dense multiplier may only be able to perform multiply accumulates on a small portion (e.g., four, eight, or twenty elements) of the sparse array at a time. In another embodiment, the sparse array may include many rows of many elements so that the dense multiplication may be performed iteratively. In an embodiment, the dense multiplication iterative calculations may be interrupted at any step of the method 300. Interrupt handling may be performed to prevent coherency and memory ordering issues when the instruction is interrupted.

Figure 3B:
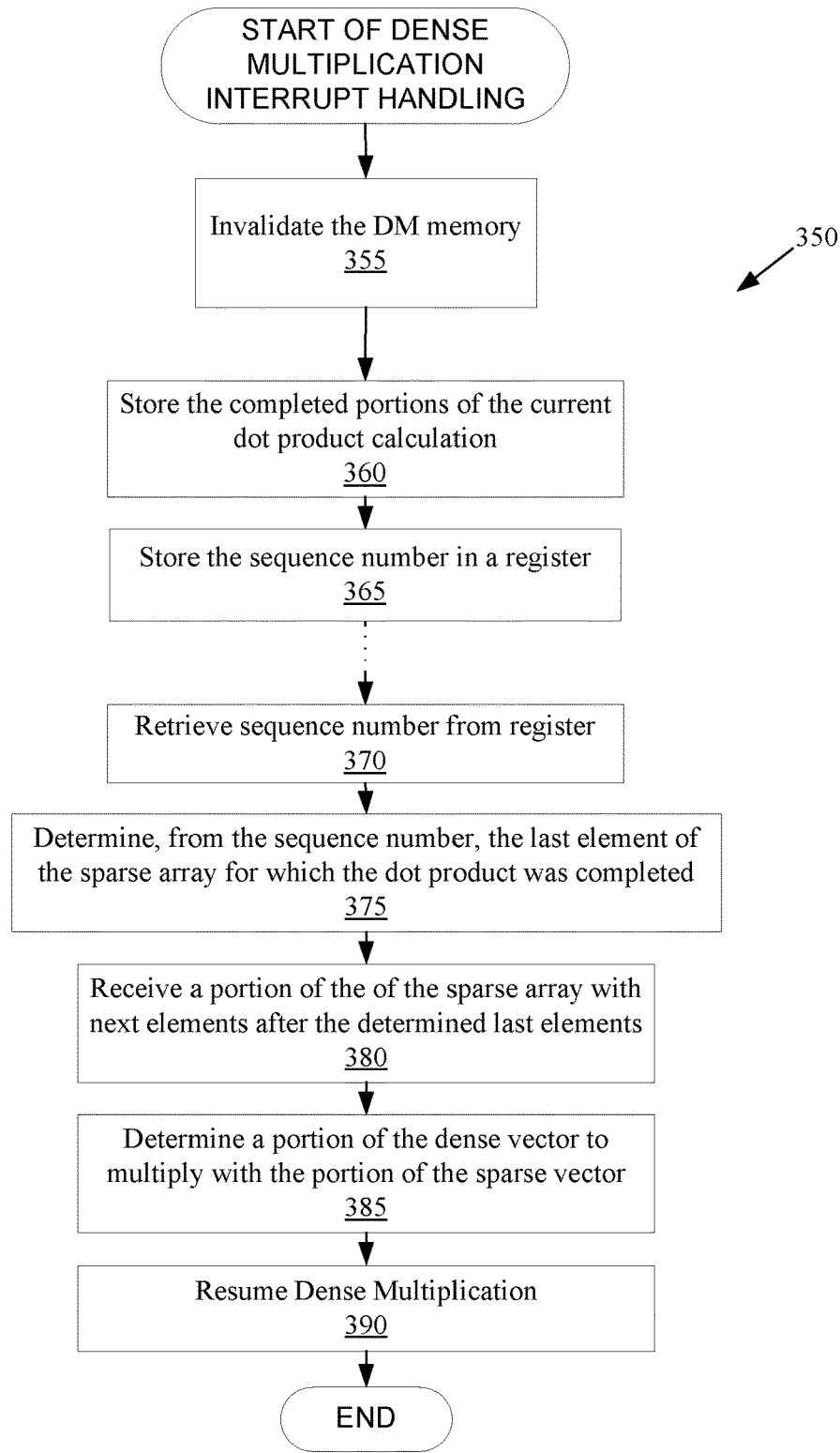
FIG. 3B is a flow diagram illustrating a method to handle an interrupt or fault during execution of a sparse array times a dense vector multiplication operation, according to an embodiment.

FIG. 3B is a flow diagram illustrating a method 350 to handle interrupts that occur while performing the dense multiplication of method 300. The method 350 may be performed by processing logic that may include hardware (e.g., processing device, circuitry, dedicated logic, programmable logic, microcode, etc.), software (e.g., instructions run on a processing device), or a combination thereof. In some implementations, the method 350 may be performed by the dense multiplication unit 200 of FIG. 1 or 2 and/or an execution unit of a processor executing a sparse array*dense vector multiplication instruction.

As shown in FIG. 3B, the method 350 may begin with the processing logic invalidating the DM memory (block 355). For example, the dense multiplication sequence unit 208 may flash clear the DM memory 120 by setting all valid bits to invalid. Alternately, the DM memory may include a process-ID bit that indicates the process that controls each dense vector element in the DM memory. The processing logic may further store the complete portions of the current dot product calculation (block 360). For example, the dense multiplication sequence 208 unit may output the completed multiplications of the dot product to memory 112. The processing logic may further store the sequence number in a register (block 365) and/or may write the sequence number to memory 112. For example, the dense multiplication sequence unit may 208 select a register of the register file 108 to store the sequence number.

The interrupt may occur, and once it has resolved, the instruction for the sparse matrix times dense vector operation or sparse vector times dense vector operation or may be resumed. Upon resuming the instruction, the processing logic may further retrieve the sequence number from the register or memory (block 370). For example, the dense multiplication sequence unit 208 may access the register, read the sequence number from the register, and restore the sequence number. The processing logic may further determine, from the sequence number, the last element of the sparse array for which the dot product was completed (block 375). For example, the sequence number may indicate that the last calculation to be completed was the multiply according to a row, column pair of the sparse array. The dense multiplication sequence unit 208 may retrieve the previously computed multiply or multiply accumulates of the current row. The processing logic may receive a portion of the sparse array with next elements after the determined last elements (block 380). For example, elements of the sparse array after the determined row and column pair from the sequence number may be received. The processing logic may further determine a portion of the dense vector to multiply with the portion of the sparse vector (block 385). For example, the first, third, and fifth elements of the sparse array may be multiplied with the first, third, and fifth elements of the dense vector and the three products accumulated to generate the output for the determined row of the sparse array. Processing logic may then retrieve the determined elements of the dense array from memory and write them to the DM memory. The processing logic may further resume the dense multiplication (block 390). For example, the processing logic may resume the dense multiplication from the iterative step where it was interrupted according to the method steps 300 of FIG. 3A.

Figure 4:
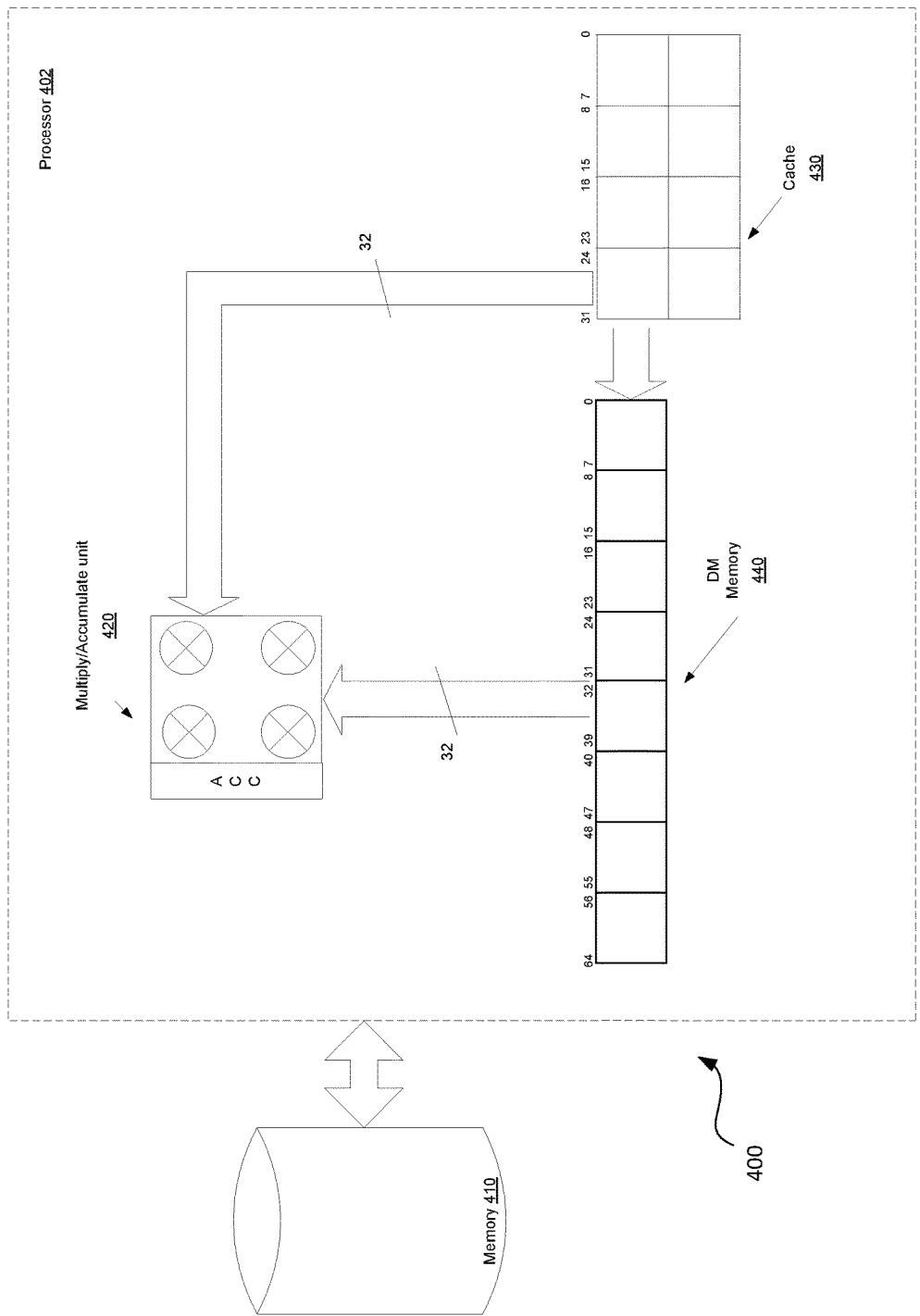
FIG. 4 is a diagram illustrating a highly-ported, narrow-bandwidth memory and cache containing a sparse array and dense vector for multiplication, according to an embodiment.

FIG. 4 illustrates an example graphical representation 400 representing a highly-ported, narrow-bandwidth memory and cache containing a sparse array and dense array for multiplication. In general, the graphical representation corresponds to the dot product calculation of sparse array and dense vector entries provided by the dense multiplication unit 200 of FIGS. 1 and 2.

As shown in FIG. 4, the graphical representation 400 may include a memory 410 corresponding to a RAM or DRAM of the computer system. The memory 410 may include a sparse array, a dense vector, and a reserved memory space for the output vector of the multiplication of the sparse array with the dense vector. Memory 410 may be operatively connected to a processor 402, and more particularly to the multiply/accumulate (MAC) unit 420, the highly-ported, highly-banked, narrow width DM memory 440, and the cache 430. Data from the memory 410 may be cached into the cache 430 for faster access to the multiply accumulate unit 420 and may be stored in the DM memory 440 for greater parallelism in the processing of the stored operands. For example, the elements of the dense vector may be stored in the DM memory 440. The MAC unit 420 may receive operands from the memory 410, the cache 430, and the DM memory 440.

Elements of the sparse array and dense vector may be read from and written to memory 410 using a gather or scatter operation. For example, a sparse array may be stored in a compressed representation where an array of element values in the sparse array may be stored and referenced in conjunction with an array of element indexes corresponding to the element values in the sparse array. Additional compressed representations are discussed in more detail in conjunction with FIG. 5 below. A gather of the sparse array may be performed by accessing a first number of elements of the array of element values and accessing a first number of index values of the array of the index. The index of the sparse array elements may also be referenced against the dense vector to gather the appropriate elements for the multiplication. A scatter of the sparse array may likewise write elements into the array of elements and write an index in the array of indexes. In some embodiments, a sparse array may be stored in full. A gather of elements from the sparse array may include accessing several non-contiguous memory locations to sufficiently gather enough elements to perform each dot product calculation of the multiplication of the sparse array with the dense vector. Writing a dense output to memory may also be performed using a scatter operation. After completion of one or more dot products corresponding to one or more entries of the dense output may be scattered to a corresponding output array in memory. Sufficiently large output arrays may also be stored in non-contiguous memory locations.

The MAC unit 420 may also perform multiplications on more than one pair of operands at a time (e.g., four or eight pairs). The MAC unit 420 may receive four byte operands or eight byte operands. Processing of eight byte operands may operate on all eight bytes at once or process each operand as a lower four bytes and an upper four bytes. Each multiplication product may be accumulated to generate the resultant dot product of the row of the sparse array and dense vector multiplication. For example, the values for the dot products of the elements of the first row of the sparse array with the elements of the dense vector may be accumulated to a first element of an output vector, the values for the dot products of the elements of the second row of the sparse array with the elements of the dense vector may be accumulated to a second element of the output vector, and so on. The dot product result may be stored in the memory 410.

Cache 430 may include all of or portions of the sparse array and the dense vector. The cache may be optimized to shift out an entire line of cache to send operands to the memory 410, the MAC unit 420, and/or the DM memory 440. In another embodiment, the cache 430 may only send and receive one or two operands at a time. In one embodiment, a line of the cache may include four eight-bit operands. In another embodiment, the line of the cache may include eight or sixteen four-byte operands or eight eight-byte operands. The communication bus between the memory 410, MAC unit 420, cache 430, and DM memory 440 may be 32 bits, 64 bits, or 64 bytes. One of ordinary skill in the art would recognize the benefits of each bus size and also appreciate that the bus may be expanded to support differing capacities beyond those listed.

DM memory 440 is a highly-banked, highly-ported, narrow-bandwidth memory. A highly-banked, highly-ported memory may include a large number of input/output ports to read/write many operands of data at once. For example, DM memory 440 may have 4 ports for receiving and sending (read/write) four operands at once. In another embodiment, memory 440 may have eight or sixteen ports. A narrow-bandwidth or narrow-width memory may receive operands of four bytes or eight bytes. DM memory 440 may be operatively connected to the cache 430 to receive operands for each end every port by shifting an entire line of cache into the memory in the same cycle.

During execution of an instruction to multiply a dense vector by a sparse array, cache 430 may cache entries of both the dense vector and the sparse array. DM memory 440 may read a cache line of dense vector elements corresponding to the next elements of a row of the sparse array. MAC unit 420 may calculate the dot product of the row in one cycle or multiple cycles for iteratively stepping through a lengthy row having more elements than multipliers and accumulate registers. Sequence numbers corresponding to the row and column of the sparse array may be updated after each multiply and accumulate is completed for the dot product at the MAC unit 420. An interrupt may cause the memory 440 to be flash cleared by setting data in the memory as invalid. The current calculated output of the MAC unit 410 may be written to memory 410 and the sequence number stored in a register. Upon resuming, the sequence number and/or the partially calculated dot product may be retrieved. The sequence number may be extrapolated into a row and column where operations were last completed and elements of the sparse array read into the cache 430 or MAC unit 420 for processing. The corresponding dense vector elements are identified from the elements of the sparse array and those elements are written into the cache 430 or DM memory 440 for processing. The MAC unit 420 may continue calculating the dot product from where the processing last left off.

The DM memory 440 may not be exposed architecturally to the processor 402. The DM memory 440 may be instantiated micro-architecturally by the sparse array*dense vector multiplication instruction, and may be managed by hardware. Thus, the DM memory 440 may act as a scratchpad for dense multiplication operations that exists for the duration of execution of the sparse array*dense vector multiplication instruction.

Figure 5:
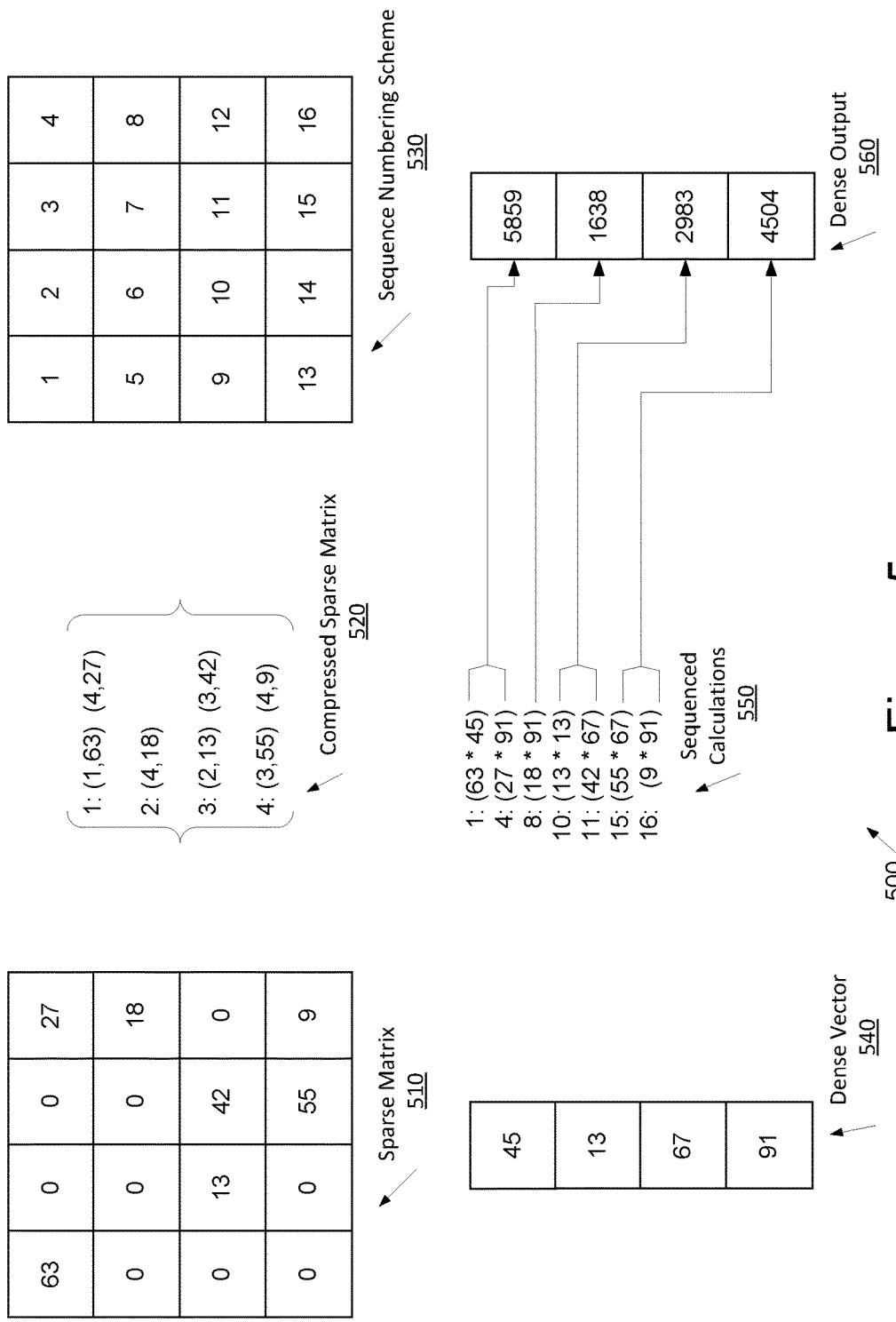
FIG. 5 is a diagram illustrating the flow of multiplication calculations between a sparse array and dense vector, according to an embodiment.

FIG. 5 illustrates an example graphical representation 500 of the flow of calculations for a multiplication of a sparse matrix and dense vector by a series of sequenced numbers. In general, the graphical representation corresponds to the eviction of a cache entry and subsequent neighboring entries by the dense multiplication unit 200 of FIGS. 1 and 2.

Referring to FIG. 5, a processing device may receive a command to execute an instruction for a dense vector by sparse matrix multiplication. Alternatively, the processing device may receive a command to execute an instruction for a dense vector by a sparse vector multiplication. The processor causes the dense multiplication unit 200 to begin processing the multiplication on the sparse matrix (or vector) and dense vector according to a sequence numbering scheme. The sparse matrix 510 and sparse vector may be two types of sparse arrays. The sparse matrix 510 may be represented in a full format, where each column, row entry is represented by a numerical value. Sparse matrices may also be represented in a compressed format. Compressed sparse matrix 520 includes a set of rows where only non-zero elements are represented as a column, value pair. Compressed sparse matrices may be represented in Compressed Sparse Row (CSR) or Compressed Spare Column (CSC) format. The CSR or compressed row storage (CRS) format represents a matrix by three (one-dimensional) arrays that respectively contain non-zero values, the extents of rows, and column indices. This format allows fast row access and matrix-vector multiplications. A person of ordinary skill in the art will recognize that embodiments described herein are adaptable to alternative compressed formats (e.g., dictionary of keys, lists of lists, and coordinate list formats) for representing the sparse array without departing from the teachings herein.

A sparse vector may be embodied according to the description above with regards to a sparse matrix where the sparse vector may have one row, a compressed sparse vector may have one row, and the sequence numbering scheme corresponding to the sparse vector may also have one row.

The dense and/or sparse vector may be terminated by a sentinel (index=−1) or have a corresponding length identifying the number of elements in the vector. The dense multiplier 202 may multiply the compressed sparse matrix 520 with the dense vector 540 according to the sequence numbering scheme 530. For example, a sequence numbering scheme 530 may be generated for any size of sparse matrix by numbering each column, row entry of the sparse matrix 510 from the first to the last. One of ordinary skill in the art would recognize that numbering of a sparse vector may be in accordance to the numbering of a sparse matrix with only one row. A dot product of a row may be calculated using the sequence numbering scheme 530 in place of a nested loop which counts for each row from 1 to the max length of each column. For the sparse matrix 510, the sequencing numbering scheme 530 identifies elements 1-16 corresponding to each of the columns 1-4 and rows 1-4 of the sparse array. When generating the dot product according to the numbering scheme, the dense multiplication sequencing unit may identify iterative steps 1-4 and evaluate the compressed sparse matrix determine if for row 1, any of elements corresponding to entries 1-4 exist. For example, in sparse matrix 510, entries 1 and 4 exist. The memory 120 may be populated with dense vector elements 1 and 4 or with a row of elements 1-4. The dense multiplier 202 may follow iteratively, a series of a sequenced calculations 550 derived from the sequence numbering scheme. For example, a multiply at element 1 and a multiply at element 4 may be combined with an accumulate at every second element. At every row end, a dot product result may be output to the dense output array 560 (e.g., a dense output vector) in a corresponding entry. For example, at element 1 a multiply occurs and at element 4 a multiply occurs, since there are two multiplies a single accumulate is performed and since the end of the row has been reached, a dot product may be output into the first row of the dense output 560.

An interrupt may be received at any time during execution which causes processing to stop. For example, at sequence number 10, a value 169 may reside in the dense multiplier but a second value corresponding to sequence number 11 may not have been computed. The calculation of the dot product for row three of the dense output 560 is not completed. The partially computed result may be stored in RAM and a sequence number 11 may be stored in a register. Upon resuming the instruction, the dense multiplication sequence unit may retrieve the sequence number 11 from a register, determine the sequence number corresponds to row 3 of the sequence numbering scheme 530, and retrieve the partially computed dot product from RAM. The dense multiplication sequence unit 208 may evaluate the compressed sparse matrix to determine if any of the remaining elements 11 and 12 exist and then read those values into the cache for processing upon determining that the elements exist. Corresponding dense vector entries may also be read based upon the identified remaining row entries of the sparse matrix. The sparse array and dense vector multiplication calculations may then continue according to the sequence calculations 550 until the multiplication is complete.

Figure 6:
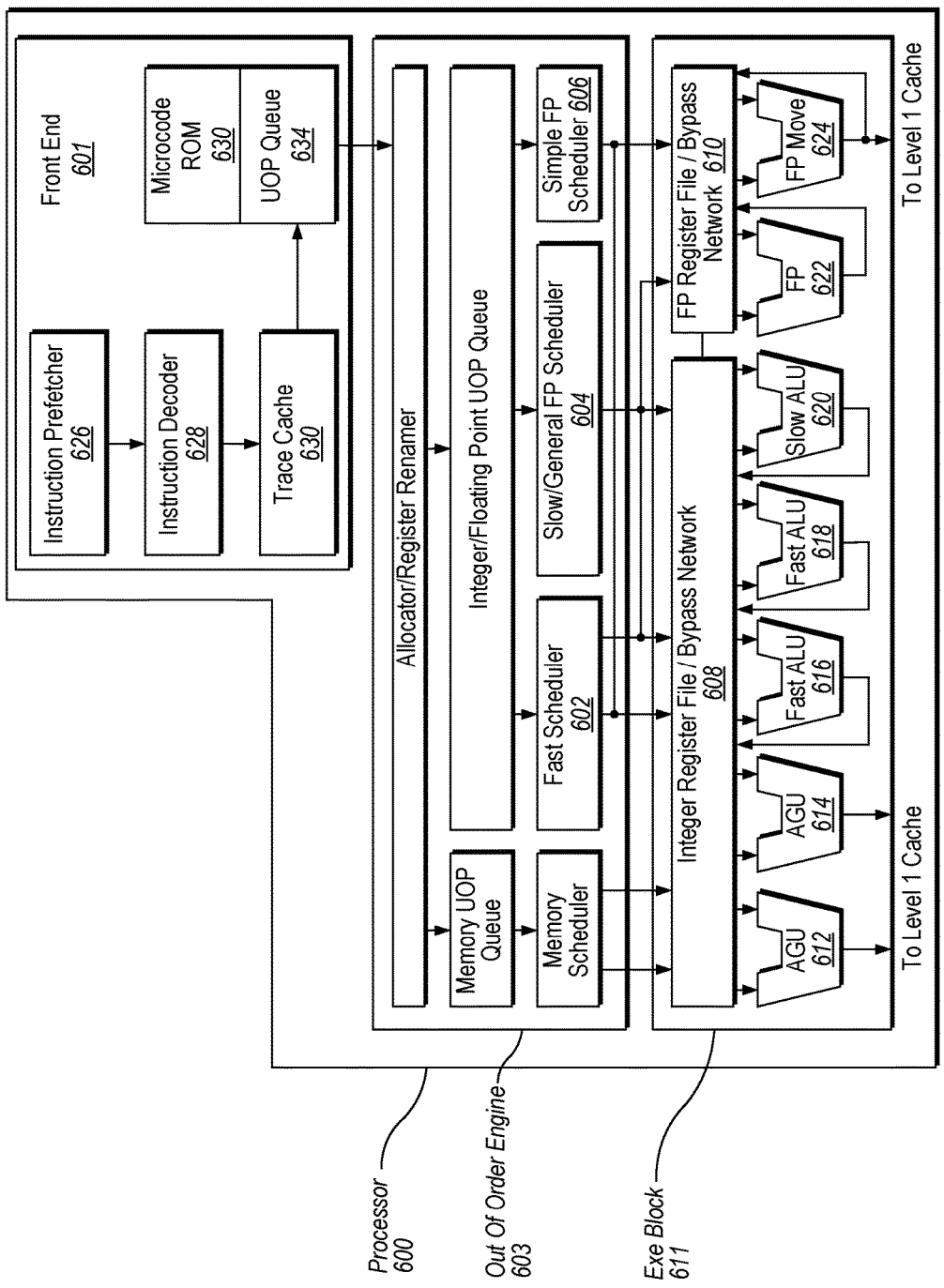
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. An example instruction that may be fetched includes a sparse matrix times dense vector multiplication instruction or a sparse vector times dense vector multiplication instruction. In one embodiment, the decoder decodes a received instruction into one or more operations called "microinstructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, the sparse matrix times dense vector multiplication instruction and the sparse vector times dense vector multiplication instruction are complex instructions that have multiple operands (e.g., micro-ops) and are implemented in microcode. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width. In one embodiment, the register files include a register file for storing a sequence number as described herein above.

The execution block 611 contains the execution units 612, 614, 616, 618, 620, 622, 624, where the instructions are actually executed. This section includes the register files 608, 610, that store the integer and floating point data operand values that the microinstructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
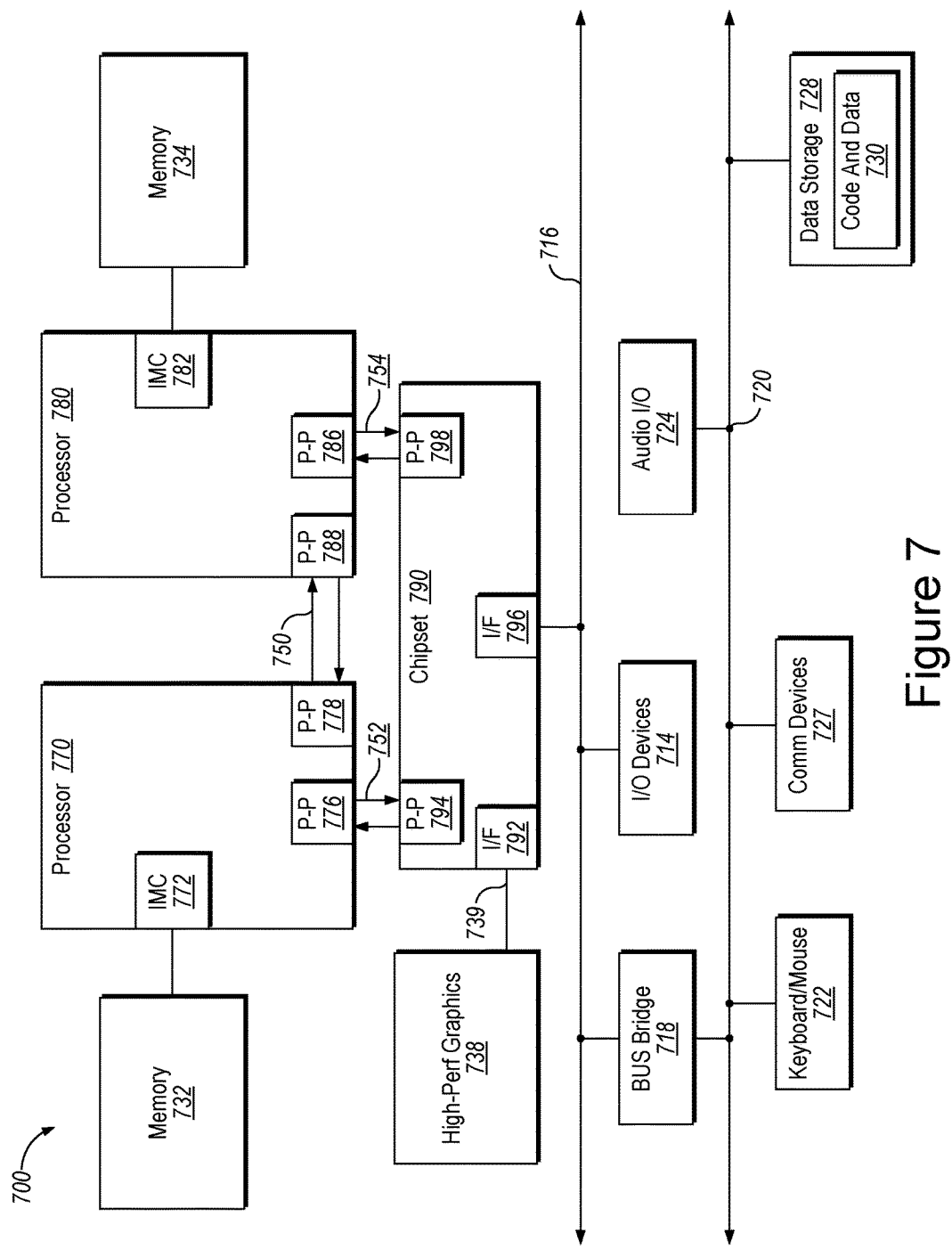
FIG. 7 is a block diagram illustrating a system in which an embodiment of the disclosure may be used.

Referring now to FIG. 7, shown is a block diagram illustrating a system 700 in which embodiments of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
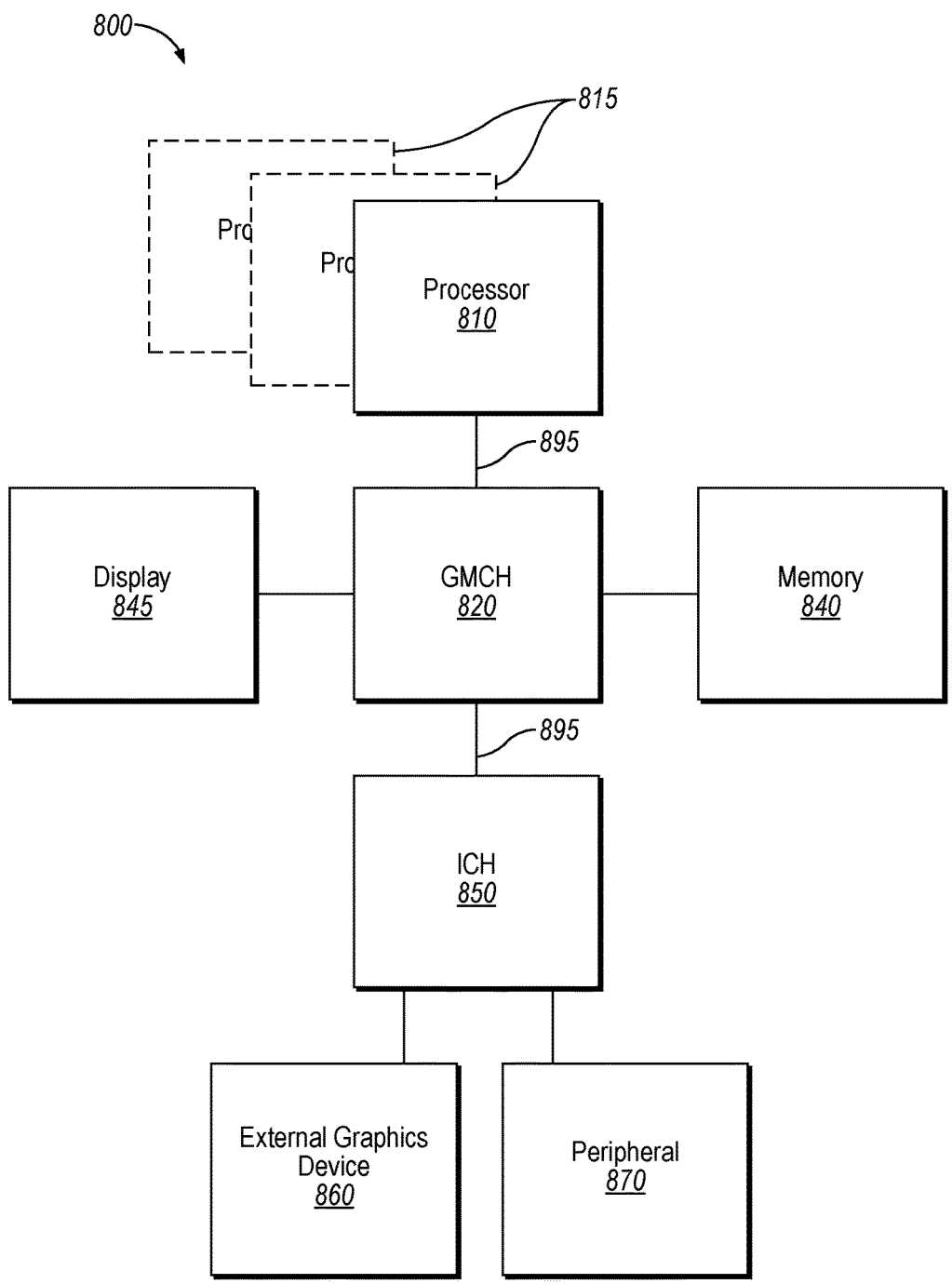
FIG. 8 is a block diagram of a system in which an embodiment of the disclosure may operate.

Referring now to FIG. 8, shown is a block diagram of a system 800 in which embodiments of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
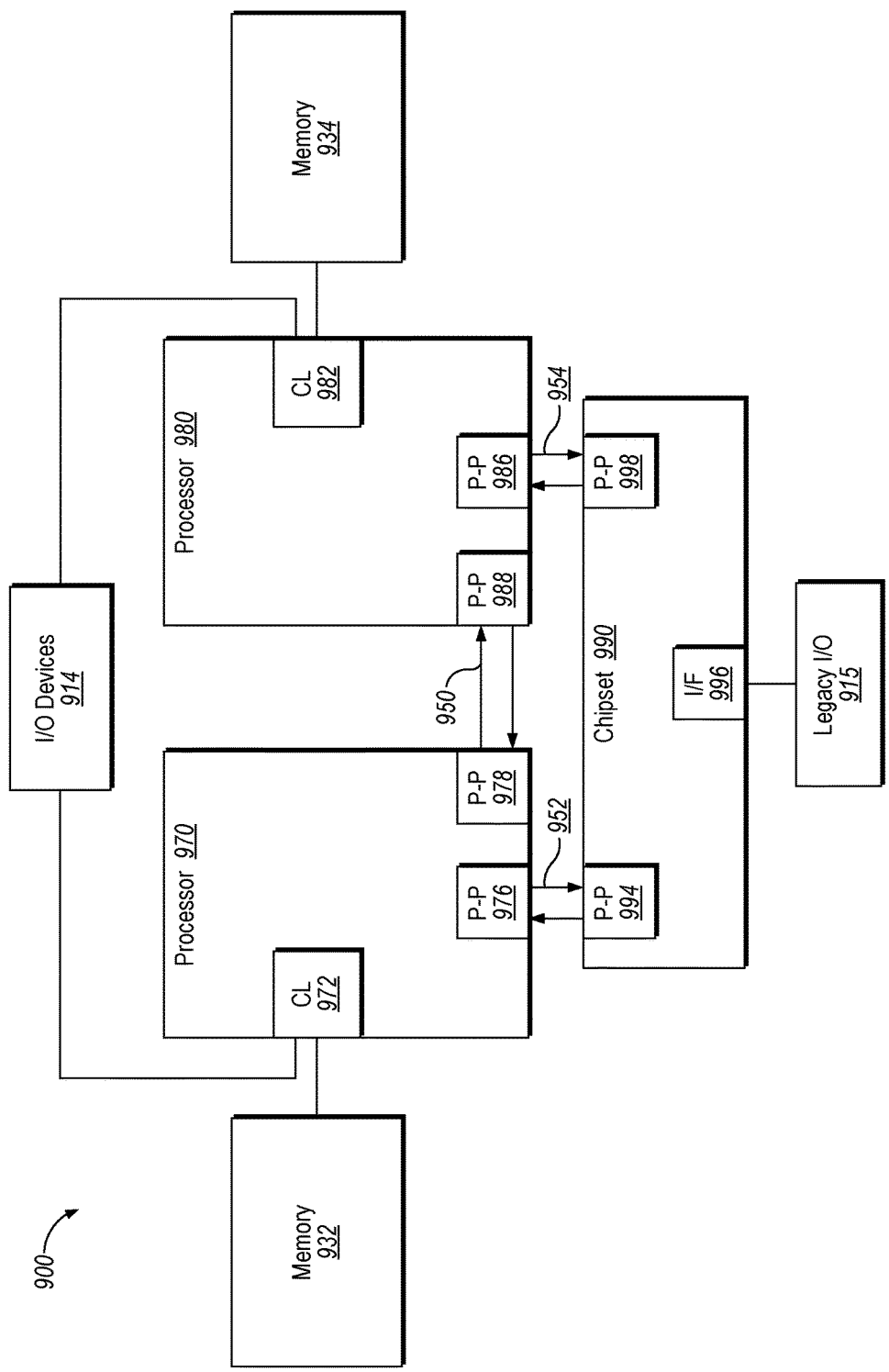
FIG. 9 is a block diagram of a system in which an embodiment of the disclosure may operate.

Referring now to FIG. 9, shown is a block diagram of a system 900 in which embodiments of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
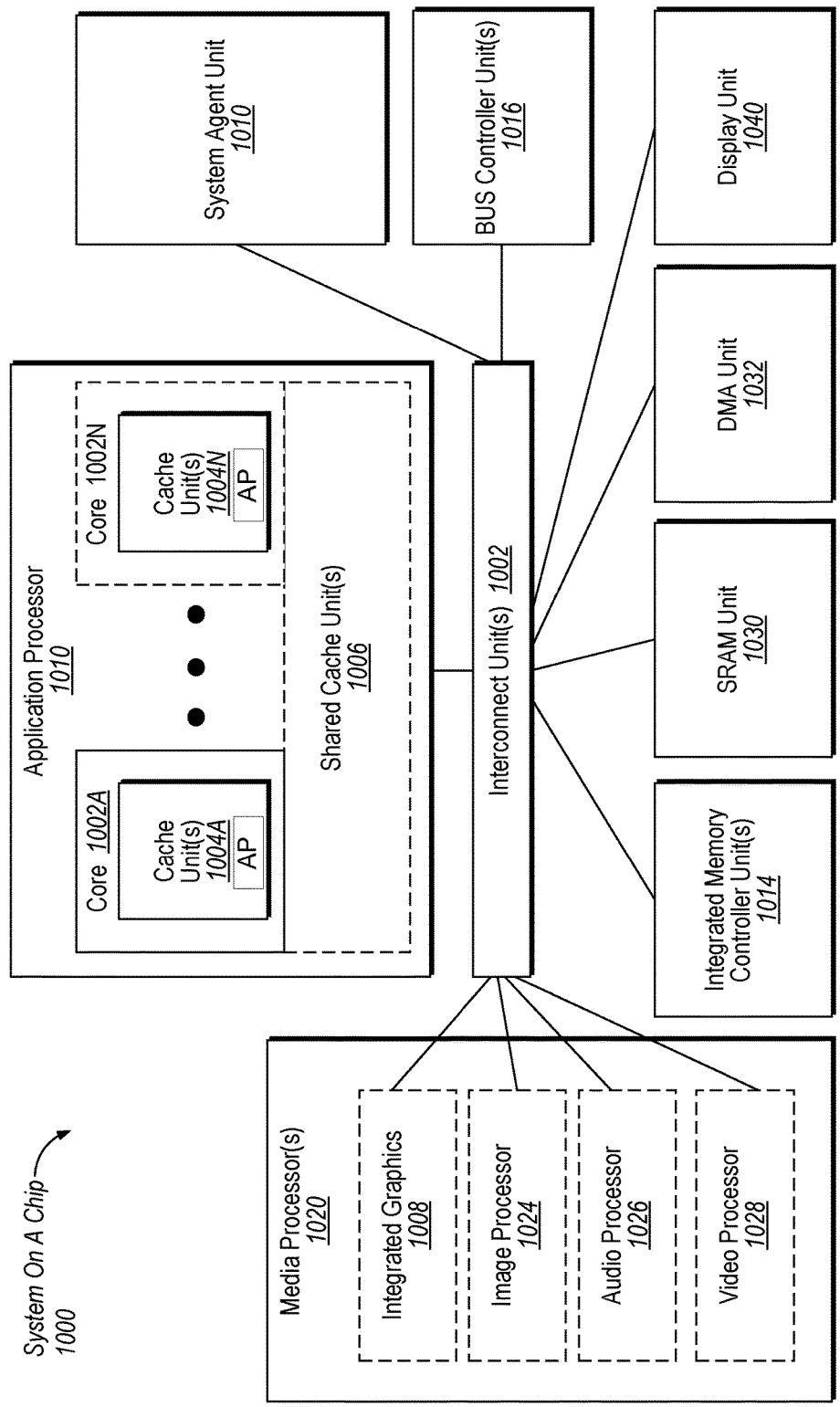
FIG. 10 is a block diagram of a System-on-a-Chip (SoC) in accordance with an embodiment of the present disclosure.

Embodiments may be implemented in many different system types. FIG. 10 is a block diagram of a SoC 1000 in accordance with embodiments of the present disclosure. Dashed lined boxes are optional features on more advanced SoCs. In FIG. 10, an interconnect unit(s) 1012 is coupled to a plurality of functional units, including: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™ Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
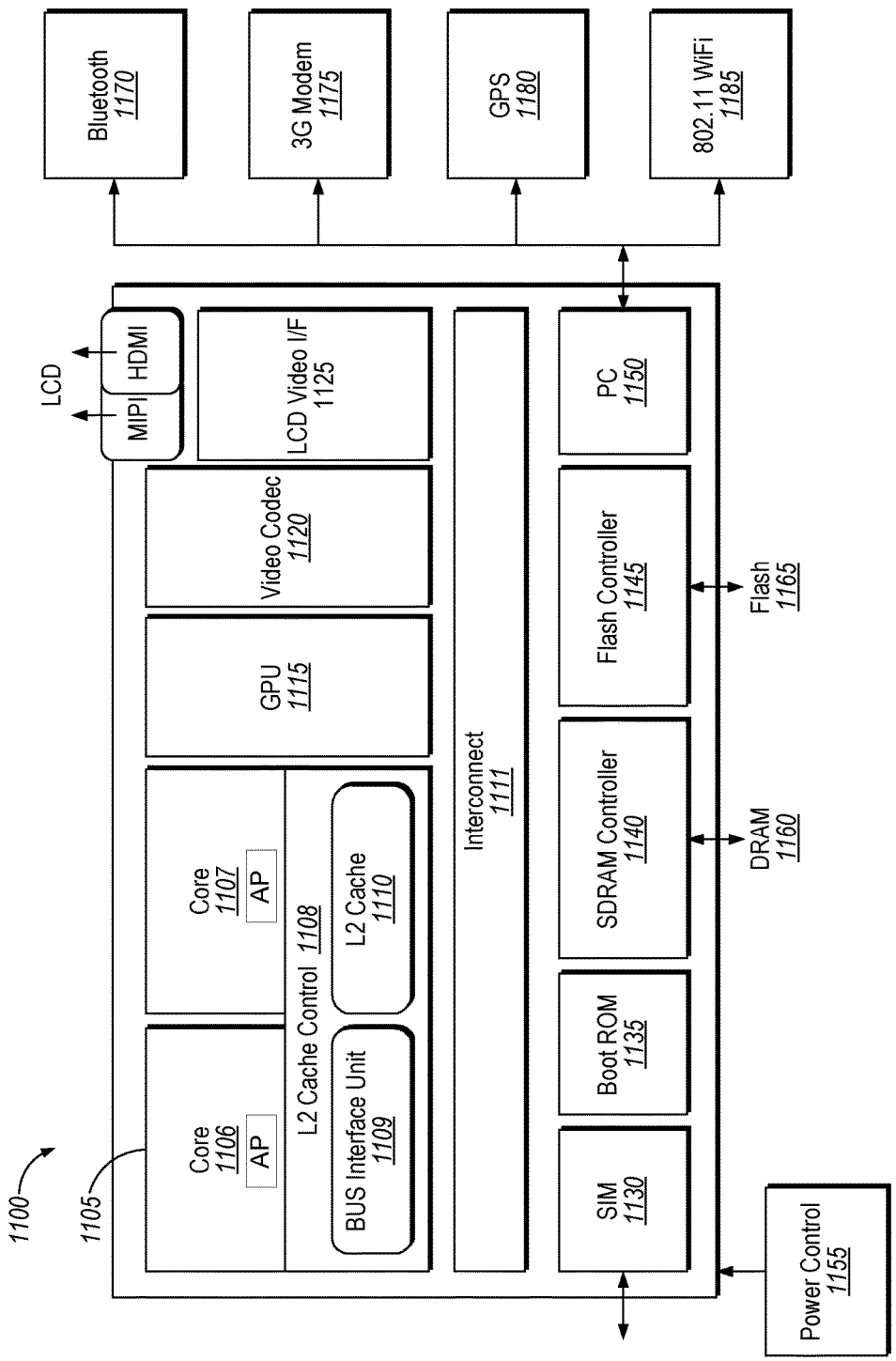
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
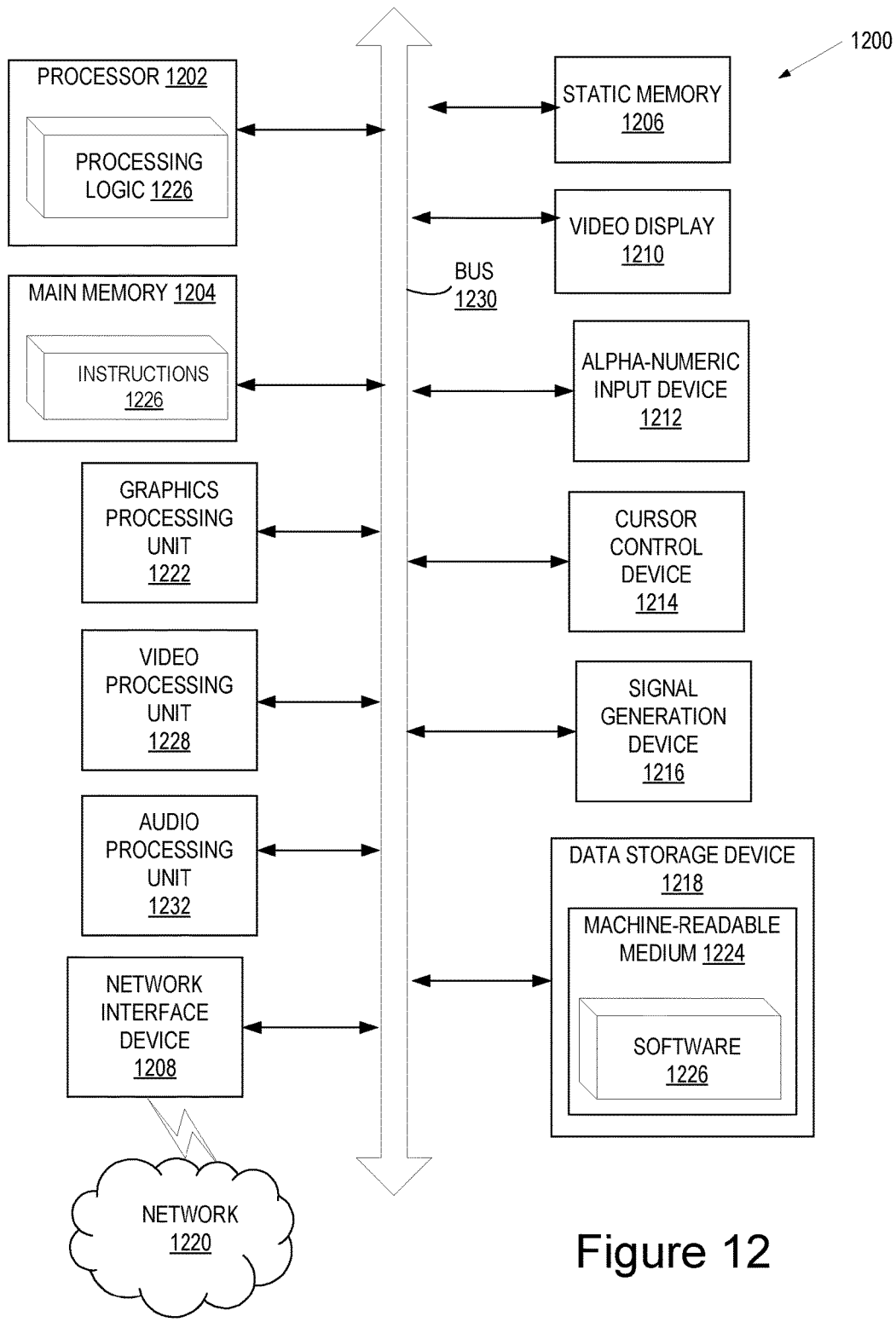
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to further embodiments.

Example 1 is a processing device comprising 1) a memory; and 2) a dense multiplier hardware circuit operatively coupled with the memory, the dense multiplier hardware circuit to 3) determine first elements of a dense vector to be multiplied with first elements of a first row of a sparse array; 4) write the first elements of the dense vector into the memory; 5) calculate a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector; and 6) update a sequence number after each increment is completed, wherein the sequence number identifies a column number and a row number of the sparse array for which the dot product has been completed.

In Example 2, the processing device of Example 1, optionally further to 1) a cache; and the dense multiplication circuit further to: 2) determine at least one line of the cache that comprises the first elements of the dense vector; 3) write the at least one line of the cache into the memory, wherein the at least one line of the cache further comprises one or more additional elements of the dense vector that are not necessary for calculating the dot product with the first elements of the sparse array.

In Example 3, the processing device of Example 1 or Example 2, 1) wherein the first elements of the dense vector comprise those elements of the dense vector that are necessary for computing the dot product, and does not comprise those elements of the dense vector that are both a) not necessary for computing the dot product and b) not in a cache line that comprises one or more of those elements of the dense vector that are necessary for computing the dot product.

In Example 4, the processing device of Example 3, the dense multiplier optionally further to: 1) receive a second portion of the sparse array; 2) determine second elements of the dense vector that are not already stored in the memory based on the second portion of the sparse array; 3) write the second elements of the dense vector into the memory; and 4) calculate a dot product between the second elements of the sparse array and the dense vector comprising the first portion and the second portion.

In Example 5, the processing device of any of Examples 1-4, optionally to 1) the sparse array comprises a matrix having a plurality of columns and a plurality of rows; and 2) the sequence number comprises a value for each row and column pair of the sparse array.

In Example 6, the processing device of any of Examples 1-5, wherein 1) the memory is only in use during the execution of an instruction for multiplying the dense vector with the sparse array.

In Example 7, the processing device of Example 6, wherein the instruction for multiplying the dense vector with the sparse array optionally to include 1) a first field identifying a memory start address of the dense vector; 2) a second field identifying a memory start address of the sparse array; 3) a third field identifying a length of the dense vector; and 4) a fourth field identifying a memory start address of an output vector.

In Example 8, the processing device of Example 7, wherein the instruction for multiplying the dense vector with the sparse array is a memory-to-memory instruction, the processing device optionally further to include 1) a core, wherein the core is to 2) read the first elements of the first row of the sparse array from a Random Access Memory (RAM) using the second field; 3) read the first elements of the dense vector from the RAM using the first field; and 4) write the value that is computed after each increment is completed to the RAM using the fifth field.

In Example 9, the processing device of any of Examples 1-8, wherein the dense multiplier hardware circuit is optionally further to perform the following in response to receiving an interrupt or fault 1) invalidate the memory; 2) store a value of a completed portion of the dot product; and 3) store the sequence number in a register.

In Example 10, the processing device of claim 9, wherein the dense multiplier hardware circuit is optionally further to perform the following in response to the interrupt or fault being successfully handled 1) retrieve the sequence number from the register; 2) determine, from the sequence number, a last element of the sparse array for which the dot product was completed; 3) receive a portion of the sparse array, where the portion of the sparse array comprises next elements after the last element of the sparse array for which the dot product was completed; 4) determine a portion of the dense vector to be multiplied with the portion of the sparse array; 5) write the portion of the dense vector into the memory; 6) calculate a dot product for the portion of the sparse array and the portion of the dense vector; and 7) add a result of the dot product of the portion of the sparse array and the portion of the dense vector to the completed portion of the dot product.

In Example 11, the processing device of Example 10, optionally further to wherein one or more elements in the portion of the dense vector correspond to one or more of the first elements of the dense vector.

In Example 12, the processing device of any of Examples 1-11, optionally further to 1) wherein the sparse array comprises a sparse matrix, and 2) wherein the first portion of the sparse array is a first row of the sparse matrix.

In Example 13, the processing device of any of Examples 1-12, optionally further to 1) the memory comprises a first plurality of ports operatively connected to a Random Access Memory (RAM); and 2) the dense multiplier hardware circuit is further to read the first plurality of elements of the dense vector from the RAM, by the first plurality of ports of the memory, to the memory during a read cycle, wherein the elements of the dense vector have a length and the first plurality of elements includes an element for each port of the plurality of ports.

Example 14 is a method comprising 1) determining first elements of a dense vector to be multiplied with first elements of a first row of a sparse array; 2) writing the first elements of the dense vector into a memory; 3) calculating, by a dense multiplier hardware circuit, a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector; and 4) updating a sequence number after each increment is completed, wherein the sequence number identifies a column number and a row number of the sparse array for which the dot product has been completed.

In Example 15, the method of Example 14, optionally further to 1) receiving a second portion of the sparse array; 2) determining second elements of the dense vector that are not already stored in the memory based on the second portion of the sparse array; 3) writing the second elements of the dense vector into the memory; and 4) calculating a dot product between the second elements of the sparse array and the dense vector comprising the first portion and the second portion.

In Example 16, the method of Example 14 or Example 15, optionally further to 1) receiving an interrupt or fault, and 2) in response to receiving an interrupt or fault: 3) invalidating the memory; 4) storing a value of a completed portion of the dot product; and 5) storing the sequence number in a register.

In Example 17, the method of Example 16, optionally further to 1) detecting the interrupt or fault has been successfully handled, and 2) in response to the interrupt or fault being successfully handled: 3) retrieving the sequence number from the register; 4) determining, from the sequence number, a last element of the sparse array for which the dot product was completed; 5) receiving a portion of the sparse array, where the portion of the sparse array comprises next elements after the last element of the sparse array for which the dot product was completed; 6) determining a portion of the dense vector to be multiplied with the portion of the sparse array; 7) writing the portion of the dense vector into the memory; 8) calculating a dot product for the portion of the sparse array and the portion of the dense vector; and 9) adding a result of the dot product of the portion of the sparse array and the portion of the dense vector to the completed portion of the dot product.

Example 18 is a system comprising: 1) a Random Access Memory (RAM) 2) a processing device operatively coupled with the RAM, the processing device comprising 3) a cache; 4) a memory; 5) a decode unit to decode an instruction for multiplying a dense vector with a sparse array; and 6) an execution unit, coupled with the decode unit, to execute the instruction, wherein the execution unit is to 7) determine first elements of a dense vector to be multiplied with first elements of a first row of a sparse array; 8) write the first elements of the dense vector into the memory; 9) calculate a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector; and 10) update a sequence number after each increment is completed, wherein the sequence number identifies a column number and a row number of the sparse array for which the dot product has been completed.

In Example 19, the system of Example 18, the processing device optionally further to: 1) receive, from the RAM, a second portion of the sparse array; 2) determine second elements of the dense vector that are not already stored in the memory based on the second portion of the sparse array; 3) write the second elements of the dense vector into the memory; and 4) calculate a dot product between the second elements of the sparse array and the dense vector comprising the first portion and the second portion.

In Example 20, the system of Example 18 or Example 19, the processing device optionally further to: 1) receive an interrupt or fault; 2) in response to receiving an interrupt or fault: 3) invalidate the memory; 4) store a value of a completed portion of the dot product; and 5) store the sequence number in a register; 6) detect the interrupt or fault has been successfully handled, and 7) in response to the interrupt or fault being successfully handled: 8) retrieve the sequence number from the register; 9) determine, from the sequence number, a last element of the sparse array for which the dot product was completed; 10) receive, from the RAM, a portion of the sparse array, where the portion of the sparse array comprises next elements after the last element of the sparse array for which the dot product was completed; 11) determine a portion of the dense vector to be multiplied with the portion of the sparse array; 12) write the portion of the dense vector into the memory; 13) calculate a dot product for the portion of the sparse array and the portion of the dense vector; and 14) add a result of the dot product of the portion of the sparse array and the portion of the dense vector to the completed portion of the dot product.

Example 21 is a system on a chip (SOC) comprising 1) a plurality of functional units; 2) a memory, and 3) a controller, coupled to the functional units, to 4) receive first elements of a first row of a sparse array; 5) determine first elements of a dense vector to be multiplied with the first elements of the first row of the sparse array; 6) write the first elements of the dense vector into the memory; 7) calculate a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector; 8) output a value of the dot product after the dot product is completed; and 9) update a sequence number after each increment is completed, wherein the sequence number identifies a column number and a row number of the sparse array for which the dot product has been completed.

In Example 22, the SOC of Example 21, further comprising the subject matter of and of Examples 2-13.

In Example 23, the SOC of Example 21, wherein the controller is further operable to perform the subject matter of any of Examples 14-17.

Example 24 is an apparatus comprising 1) means for receiving first elements of a first row of a sparse array; 2) means for determining first elements of a dense vector to be multiplied with the first elements of the first row of the sparse array; 3) means for writing the first elements of the dense vector into a memory; 4) means for calculating, by a dense multiplier hardware circuit, a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector; 5) means for outputting a value of the dot product after the dot product is completed; and 6) means for updating a sequence number after each increment is completed, wherein the sequence number identifies a column number and a row number of the sparse array for which the dot product has been completed.

In Example 25, the apparatus of Example 24, further comprising the subject matter of any of Examples 1-17.

Example 26 is an apparatus comprising 1) a memory; and 2) a processor coupled to the memory and comprising a controller, wherein the controller is configured to perform the method of any of Examples 14-17.

In Example 27, the apparatus of Example 26, further comprising the subject matter of any of Examples 1-13.

Example 28 is a non-transitory machine-readable storage medium including instructions that, when accessed by a processing device, cause the processing device to perform operations comprising 1) receiving first elements of a first row of a sparse array; 2) determining first elements of a dense vector to be multiplied with the first elements of the first row of the sparse array; 3) writing the first elements of the dense vector into a memory; 4) calculating, by a dense multiplier hardware circuit, a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector; 5) outputting a value of the dot product after the dot product is completed; and 6) updating a sequence number after each increment is completed, wherein the sequence number identifies a column number and a row number of the sparse array for which the dot product has been completed.

In Example 29, the non-transitory machine-readable storage medium of Example 28, wherein the operations further comprise the subject matter of any of Examples 14-17.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, circuits, methods and so forth, in order to provide a good understanding of several embodiments. It will be apparent to one skilled in the art, however, that at least some embodiments may be practiced without these specific details. In other instances, well-known circuits or methods are not described in detail or represented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing device comprising:
a memory; and
a dense multiplication hardware circuit operatively coupled with the memory, the dense multiplication hardware circuit to:
   determine first elements of a dense vector to be multiplied with first elements of a first row of a sparse array;
   write the first elements of the dense vector into the memory;
   calculate a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector;
   update a sequence number after each increment is completed, wherein the sequence number identifies a column number and a row number of the sparse array for which the dot product has been completed; and
   in response to receipt of an interrupt or fault that causes a context switch in instruction execution:
      invalidate the memory where the first elements are stored;
      store, in the memory, a value of a completed portion of the dot product; and
      store, in a register, the sequence number.

2. The processing device of claim 1, further comprising:
a cache; and
the dense multiplication hardware circuit is further to:
   determine at least one line of the cache that comprises the first elements of the dense vector; and
   write the at least one line of the cache into the memory, wherein the at least one line of the cache further comprises one or more additional elements of the dense vector that are not necessary for calculating the dot product with the first elements of the sparse array.

3. The processing device of claim 1, wherein the first elements of the dense vector comprise those elements of the dense vector that are necessary for computing the dot product, and excludes those elements of the dense vector that are both a) not necessary for computing the dot product and b) not in a cache line that comprises one or more of those elements of the dense vector that are necessary for computing the dot product.

4. The processing device of claim 3, wherein the first elements of the sparse array come from a first portion of the sparse array, and wherein the dense multiplication hardware circuit further to:
receive a second portion of the sparse array that comprises second elements;
determine second elements of the dense vector that are not already stored in the memory based on the second portion of the sparse array;
write the second elements of the dense vector into the memory; and
calculate a dot product between the second elements of the sparse array and the dense vector.

5. The processing device of claim 1, wherein:
the sparse array comprises a matrix having a plurality of columns and a plurality of rows; and the sequence number comprises a sequence value for each row and column pair of the sparse array.

6. The processing device of claim 1, wherein the memory is only in use during the execution of an instruction for multiplying the dense vector with the sparse array.

7. The processing device of claim 6, wherein the instruction for multiplying the dense vector with the sparse array comprises:
a first field identifying a memory start address of the dense vector;
a second field identifying a memory start address of the sparse array;
a third field identifying a length of the dense vector; and
a fourth field identifying a memory start address of an output vector.

8. The processing device of claim 7, wherein the instruction for multiplying the dense vector with the sparse array is a memory-to-memory instruction, the processing device further comprising an execution unit, wherein, in response to the execution of the instruction for multiplying the dense vector and the sparse array, the execution unit is to:
read the first elements of the first row of the sparse array from a Random Access Memory (RAM) using the second field;
read the first elements of the dense vector from the RAM using the first field; and
write the value that is computed after each increment is completed to the RAM using the fourth field.

9. The processing device of claim 1, wherein the dense multiplication hardware circuit is further to, in response to the interrupt or fault being successfully handled:
retrieve the sequence number from the register;
determine, from the sequence number, a last element of the sparse array for which the dot product was completed;
receive a portion of the sparse array, where the portion of the sparse array comprises next elements after the last element of the sparse array for which the dot product was completed;
determine a portion of the dense vector to be multiplied with the portion of the sparse array;
write the portion of the dense vector into the memory;
calculate a dot product for the portion of the sparse array and the portion of the dense vector; and
add a result value of the dot product of the portion of the sparse array and the portion of the dense vector to the value of the completed portion of the dot product.

10. The processing device of claim 9, wherein one or more elements in the portion of the dense vector correspond to one or more of the first elements of the dense vector.

11. The processing device of claim 1, wherein the sparse array comprises a sparse vector, and wherein a first portion of the sparse array comprises elements from the sparse vector.

12. The processing device of claim 1, wherein:
the memory comprises a plurality of ports operatively coupled to a Random Access Memory (RAM); and
the dense multiplication hardware circuit is further to copy the first elements of the dense vector from the RAM via the plurality of ports, to the memory during a read cycle, and wherein the first elements comprise an element for each port of the plurality of ports.

13. A method comprising:
determining, by a processing device, first elements of a dense vector to be multiplied with first elements of a first row of a sparse array;
writing, by the processing device, the first elements of the dense vector into a memory coupled to the processing device;
calculating, by a dense multiplication hardware circuit of the processing device, a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector;
outputting a value after calculation of the dot product is completed;
updating a sequence number after each increment is completed, wherein the sequence number identifies a column number and a row number of the sparse array for which the dot product has been completed; and
in response to receipt of an interrupt or fault that causes a context switch in instruction execution:
invalidating the memory where the first elements are stored;
storing, in the memory, a value of a completed portion of the dot product; and
storing, in a register, the sequence number.

14. The method of claim 13, wherein the first elements of the sparse array come from a first portion of the sparse array, the method further comprising:
receiving a second portion of the sparse array that comprises second elements;
determining second elements of the dense vector that are not already stored in the memory based on the second portion of the sparse array;
writing the second elements of the dense vector into the memory; and
calculating a dot product between the second elements of the sparse array and the dense vector.

15. The method of claim 13, further comprising:
detecting the interrupt or fault has been successfully handled; and
in response to the interrupt or fault being successfully handled:
retrieving the sequence number from the register;
determining, from the sequence number, a last element of the sparse array for which the dot product was completed;
receiving a portion of the sparse array, where the portion of the sparse array comprises next elements after the last element of the sparse array for which the dot product was completed;
determining a portion of the dense vector to be multiplied with the portion of the sparse array;
writing the portion of the dense vector into the memory;
calculating a dot product for the portion of the sparse array and the portion of the dense vector; and
adding a result value of the dot product of the portion of the sparse array and the portion of the dense vector to the value of the completed portion of the dot product.

16. A system comprising:
a Random Access Memory (RAM); and
a processing device operatively coupled with the RAM, the processing device comprising:
a cache;
a memory;
a decode unit to decode an instruction for multiplying a dense vector with a sparse array; and an execution unit, coupled with the decode unit, to execute the instruction, wherein the execution unit is to:
- determine first elements of a dense vector to be multiplied with first elements of a first row of a sparse array;
- write the first elements of the dense vector into the memory;
- calculate a dot product for the first elements of the sparse array and the first elements of the dense vector, wherein the dot product is calculated in a plurality of increments, where each increment comprises multiplication of a subset of the first elements of the sparse array and a corresponding subset of the first elements of the dense vector;
- update a sequence number after each increment is completed, wherein the sequence number identifies a column number and a row number of the sparse array for which the dot product has been completed;
- in response to receipt of an interrupt or fault that causes a context switch away from execution of the instruction:
  - invalidate the memory where the first elements are stored;
  - store, in the memory, a value of a completed portion of the dot product; and
  - store, in a register, the sequence number.

17. The system of claim 16, wherein the first elements of the sparse array come from a first portion of the sparse array, and wherein the processing device further to:
- receive, from the RAM, a second portion of the sparse array that comprises second elements;
- determine second elements of the dense vector that are not already stored in the memory based on the second portion of the sparse array;
- write the second elements of the dense vector into the memory; and
- calculate a dot product between the second elements of the sparse array and the dense vector.

18. The system of claim 16, the processing device further to:
- in response to the interrupt or fault being successfully handled:
  - retrieve the sequence number from the register;
  - determine, from the sequence number, a last element of the sparse array for which the dot product was completed;
  - receive, from the RAM, a portion of the sparse array, where the portion of the sparse array comprises next elements after the last element of the sparse array for which the dot product was completed;
  - determine a portion of the dense vector to be multiplied with the portion of the sparse array;
  - write the portion of the dense vector into the memory;
  - calculate a dot product for the portion of the sparse array and the portion of the dense vector; and
  - add a result value of the dot product of the portion of the sparse array and the portion of the dense vector to the value of the completed portion of the dot product.

19. The system of claim 16, wherein:
the sparse array comprises a matrix having a plurality of columns and a plurality of rows; and
the sequence number comprises a sequence value for each row and column pair of the sparse array.

20. The system of claim 16, wherein the memory is only in use during the execution of the instruction for multiplying the dense vector with the sparse array, wherein the instruction comprises:
- a first field identifying a memory start address of the dense vector;
- a second field identifying a memory start address of the sparse array;
- a third field identifying a length of the dense vector; and
- a fourth field identifying a memory start address of an output vector.

* * * * *